United States Patent [19]

Counselman, III

[11] Patent Number: 5,014,066
[45] Date of Patent: * May 7, 1991

[54] SYSTEM FOR SIMULTANEOUSLY DERIVING POSITION INFORMATION FROM A PLURALITY OF SATELLITE TRANSMISSIONS

[75] Inventor: Charles C. Counselman, III, Belmont, Mass.

[73] Assignee: Western Atlas International, Inc., Houston, Tex.

[ * ] Notice: The portion of the term of this patent subsequent to Feb. 28, 2006 has been disclaimed.

[21] Appl. No.: 382,291

[22] Filed: Jul. 20, 1989

Related U.S. Application Data

[63] Continuation of Ser. No. 895,148, Aug. 11, 1986, Pat. No. 4,870,422, which is a continuation of Ser. No. 353,331, Mar. 1, 1982, Pat. No. 4,667,203.

[51] Int. Cl.$^5$ .................. G01S 5/04; H04B 7/185
[52] U.S. Cl. .................... 342/352; 342/357; 342/465; 342/417; 342/444
[58] Field of Search .............. 342/352, 357, 450, 451, 342/453, 463, 464, 465, 417, 442, 444

[56] References Cited

U.S. PATENT DOCUMENTS

| | | | |
|---|---|---|---|
| 3,943,514 | 3/1976 | Afendykiw et al. | 342/156 |
| 4,114,155 | 9/1978 | Raab | 342/394 |
| 4,170,776 | 10/1979 | MacDoran | 342/458 |
| 4,445,118 | 4/1984 | Taylor et al. | 342/357 |
| 4,463,357 | 7/1984 | MacDoran | 342/460 |
| 4,468,793 | 8/1984 | Johnson et al. | 342/357 X |
| 4,601,005 | 7/1986 | Kilvington | 375/1 |
| 4,652,884 | 3/1987 | Starker | 342/357 |
| 4,667,203 | 5/1987 | Counselman, III | 342/357 |
| 4,701,934 | 10/1987 | Jasper | 375/1 |
| 4,751,512 | 6/1988 | Longaker | 342/357 |
| 4,754,283 | 6/1988 | Fowler | 342/461 |
| 4,785,463 | 11/1988 | Janc et al. | 375/1 |
| 4,797,677 | 1/1989 | MacDoran et al. | 342/352 |
| 4,809,005 | 2/1989 | Counselman, III | 342/352 |
| 4,862,178 | 8/1989 | Sturza et al. | 342/357 |

OTHER PUBLICATIONS

Counselman, III, Charles C., "Radio Astrometry", Annual Reviews of Astrometry and Astrophysics, vol. 14, 1976, pp. 197-214.

Counselman, Shapiro, Greenspan and Cox, "Backpack VLBI Terminal with Subcentimeter Capability", NASA Conference Publication 2115-Radio Interferometry Techniques for Geodesy, 1980, pp. 409-414.

Counselman, Gourevitch, King, Herring, Shapiro, Greenspan, Rogers, Whitney and Cappallo, "Accuracy of Baseline Determinations by Mites Assessed by Comparison with Tape, Theodolite, and Geodimeter Measurements", EOS, The Transactions of the American Geophysical Union, vol. 62, Apr. 28, 1981, p. 260.

Counselman and Shapiro, "Miniature Interferometer Terminals for Earth Surveying", Bulletin Geodesique, vol. 53, 1979, pp. 139-163.

(List continued on next page.)

Primary Examiner—Gilberto Barrón, Jr.
Assistant Examiner—John B. Sotomayor
Attorney, Agent, or Firm—E. Eugene Thigpen

[57] ABSTRACT

A method and a system are disclosed for measuring the baseline vector b between a pair of survey marks on the ground by radio interferometry using radio signals broadcast from the earth orbiting satellites of the NAVSTAR Global Positioning System (GPS), the radio signals broadcast by the satellites being double-sideband modulated with their carriers suppressed. The signals received by one antenna during a predetermined time span are separated into upper and lower sideband components. These separate components are filtered, converted to digital form, and then multiplied together. Differences in Doppler shift are utilized to distinguish the carriers of different satellites. Thus, the powers and carrier phases of the signals from a plurality of satellites are measured simultaneously and numerical data representing the measurement results are obtained at each survey mark. The measurements are performed in real time at each mark without reference to signals that are received at any other place and without knowledge of any of the coded signals that modulate the GPS carriers.

12 Claims, 4 Drawing Sheets

OTHER PUBLICATIONS

Spilker, Jr.; J. J., "GPS Signal Structure and Performance Characteristics", Navigation, vol. 25, No. 2, 1978, pp. 121-146.

Bossler, Goad and Bender, "Using the Global Positioning System (GPS) for Geodetic Positioning", Bulletin Geodesique, vol. 54, 1980, pp. 553-563.

Meeks, M. L., Editor, Methods of Experimental Physics, vol. 12 (Astrophysics), Part C (Radio Observations), 1976, pp. v-ix and as follows: Chapter 5.3: J. M. Moran, "Very Long Baseline Interferometer Systems", pp. 174-197.

Couselman and Gourevitch, "Miniature Interferometer Terminals for Earth Surveying: Ambiguity and Multipath with Global Positioning System", IEEE Transactions on Geoscience and Remote Sensing, vol. GE-19, No. 4, Oct. 1981, pp. 244-252.

Counselman and Shapiro, "Miniature Interferometer Terminals for Earth Surveying", Proceedings of the 9th GEOP Conference, An International Symposium on the Applications of Geodesy to Geodynamics, Oct. 2-5, 1978, Dept. of Geodetic Science Report No. 280, The Ohio State University, 1978, pp. 65-85.

MacDoran, Peter F., "Satellite Emission Radio Interferometric Earth Surveying Series-GPS Geodetic System", Bulletin Geodesique, vol. 53, 1979, pp. 117-138.

MacDoran, Peter F., "Series-Satellite Emission Radio Interferometric Earth Surveying", Third Annual NASA Geodynamics Program Review, Crustal Dynamics Project, Geodynamics Research, Jan. 26-29, 1981, Goddard Space Flight Center, p. 76 (plus) three viewgraph figures entitled: Satellite L-Band Ionospheric Calibration (SLIC); Series One-Way Range Receiver Simplified Block Diagram; and Series Receiver Ranger Synthesis.

MacDoran, Peter F., "Satellite Emission Range Inferred Earth Surveying, Series-GPS", JPL, presented at Defense Mapping Agency meeting, Feb. 9, 1981, 13 pages.

MacDoran, Spitzmesser and Buennagel, "Series: Satellite Emission Range Inferred Earth Surveying", Presented at the Third International Geodetic Symposium on Satellite Doppler Positioning, Las Cruces, N.M., Feb. 1982, 23 pages.

MacDoran, Spitzmesser and Buennagel, "Series: Satellite Emission Range Inferred Earth Surveying", Proceedings of the 3rd International Geodetic Symposium on Satellite Doppler Positioning, vol. 2, 1982, pp. 1143-1164.

Goad, C., "Visit with P. MacDoran, Aug. 6, 1981", Memor to Capt. Bossler, sent to Dr. Counselman, Aug. 12, 1981, 3 pages.

MacDoran, Peter F., Statements made at the 3rd International Geodetic Symposium on Satellite Doppler Positioning, Feb., 1982.

Counselman III, C. C. and I. I. Shapiro, "Miniature Interferometer Terminals for Earth Surveying", Proc. of the 2nd Int'l. Geodetic Symp. on Satellite Doppler Positioning, vol. 2, pp. 1237-1286, 1979 (avail. from Appl. Res. Lab., Univ. of Texas, Austin, Tex. 78758).

Counselman III, C. C., D. H. Steinbrecher, "The Macrometer TM: A Compact Radio Interferometry Terminal for Geodesy with GPS", Proceedings of the Third International Geodetic Symposium on Satellite Doppler Positioning, pp. 1165-1172, Feb. 8-12, 1982.

Greenspan, R. L., A. Y. Ng, J. M. Przyjemski, & J. D. Veale, "Accuracy of Relative Positioning by Interferometry with Reconstructed Carrier GPS: Experimental Results", Proceedings of the Third International Geodetic Symposium on Satellite Doppler Positioning, pp. 1177-1198, Feb. 8-12, 1982.

Hatch, Ron L., "The Synergism of GPS Code and Carrier Measurements", Proceedings of the Third International Geodetic Symposium on Satellite Doppler Positioning, pp. 1213-1231, Feb. 8-12, 1982.

Ward, Phil, "An Advanced NAVSTAR GPS Geodetic Receiver", Proceedings of the Third International Geodetic Symposium on Satellite Doppler Positioning, vol. 2, pp. 1123-1142, Feb. 8-12, 1982.

MacDoran, Peter F. and Donovan J. Spitzmesser, "Series Concept Simplified Information Flow", JPL Drawings, Nov. 1981.

MacDoran, Peter F. and Donovan J. Spitzmesser, "Series Concept Simplified Block Diagram (terrestrial applications)", JPL Drawings, Nov. 1981.

MacDoran, Peter F., "Series Application to Emergency Locator Beacons", Jet Propulsion Laboratory Interoffice Memorandum 335-81-042B, 2 pp., Oct. 26, 1981.

Ould, Peter C., and Robert J. Van Wechel, "All-Digital GPS Receiver Mechanization", Navigation, vol. 28, No. 3 (Fall 1981), pp. 178-188.

Rockwell International, Collins Government Avionics Division, "Feasibility Concept for a Translocation Survey GPS Receiver Design", Report No. 523-07711-52-00111R, final report prepared for the Department of Commerce, National Geodetic Survey, under contract NA-80-SAC-00670, Feb. 14, 1981.

SYSTEM FOR SIMULTANEOUSLY DERIVING POSITION INFORMATION FROM A PLURALITY OF SATELLITE TRANSMISSIONS

RELATED U.S. APPLICATION DATA

This application is a continuation application of U.S. patent application Ser. No. 06/895,148, which was filed on Aug. 11, 1986, now U.S. Pat. No. 4,870,422 which is a continuation application of U.S. patent application Ser. No. 353,331, which was filed on Mar. 1, 1982, now U.S. Pat. No. 4,667,203 and was copending therewith.

BACKGROUND OF THE INVENTION

The present invention relates generally to a method and system for determining position by radio and more particularly to a method and system for measuring the baseline vector between a pair of points, such as survey marks, on Earth by radio interferometry using radio signals broadcast from earth orbiting satellites.

Some systems for determining position by radio make use of the directionality of the pattern of radiation of a transmitting or a receiving antenna. Other systems, including the present invention, do not relay upon directionality of any antenna. The present invention belongs to the general class of systems in which the position of a receiving antenna is determined by measuring the difference between the phases or the group delays, or both, of signals arriving from two or more different transmitting antennas whose positions are already known. If two transmission sources are synchronized, or if the departure from synchronism of two transmitters is know independently, then a measurement at the receiving site of the difference between the group delays of the signals arriving from the two sources determines that the receiver is located, in three dimensions, on a particular hyperboloid of revolution whose foci are the positions of the transmitters. If similar measurements at the same receiving site of signals from several different, suitably positioned, transmitters are combined, then the receiving position can be determined uniquely from the point of intersection of the corresponding hyperboloids.

Techniques of determining relative positions of different sites, one with respect to another, from measurements of the phase of the group delay difference between radio signals received simultaneously at those sites are also known in the art and are collectively referred to as techniques of geodesy by radio interferometry. The antennas at the separate sites are considered to form an interferometer, and the relative position vector that extends from one antenna to the other is called the baseline vector of the interferometer. The baseline, or relative-position, vector between two antennas can be determined usually with less uncertainty than the position of either individual antennas can be, because many potential sources of error tend to affect the measurements at both antennas nearly equally, and therefore tend to cancel when differences are taken between the two antennas. The technique of geodesy by microwave radio interferometry is known to provide an unmatched combination of accuracy, speed, and range for the determination of relative-position or interferometer "baseline" vectors. Such a determination may be based upon measurements of either the group-delay difference, or the phase difference, or of both differences between the signals received at the two ends of the baseline vector. Phase measurements are inherently more accurate then group delay measurements, but the interpretation of phase measurements is more complicated due to their intrinsic, integer-cycle, ambiguity. A general discussion of interferometric measurement techniques and the associated problems of interpretation is given in an article entitled "Radio Astrometry," appearing in Annual Reviews of Astronomy and Astrophysics, Vol. 14, (1976), pp. 197–214, by Charles C. Counselman III. A large collection of relevant technical papers appears in Conference Publication 2115 of the National Aeronautics and Space Administration, entitled "Radio Interferometry Techniques for Geodesy." Geodesy by radio interferometry has been practiced with radio signals emitted by various sources including natural ones such as quasars and artificial ones such as satellites of the NAVSTAR Global Positioning System (GPS).

As is known, there are presently about six GPS satellites oribiting Earth. The orbits of the satellites can be determined with an accuracy of about 2 meters. These satellites emit radio signals with wavelengths near 19.0 centimeters and also 24.4 centimeters. Provided that the integer cycle ambiguities of interferometric phase observations of these signals can be correctly resolved, the baseline vector extending from one antenna to another can be determined interferometrically with uncertainty much smaller than the wavelengths of the GPS transmissions. Determinations of three baselines, each baseline having a length of the order of 100 meters, by means of interferometric phase measurements of GPS signals were shown to have been accurate within about 1 centimeter, according to a report published in Eos (Transactions of the American Geophysical Union), Vol. 62, page 260, Apr. 28, 1981, by Charles C. Counselman III, S. A. Gourevitch, R. W. King, T. A. Herring, I. I. Shapiro, R. L. Greenspan, A. E. E. Rogers, A. R. WHitney, and R. J. Capallo. The method employed in these interferometric baseline determinations was based on the known techniques of direct crosscorrelation at a central location of the signals received separately but simultaneously at the two ends of each baseline.

In U.S. Pat. No. 4,170,776, there is described a system for measuring the changes in a baseline vector between a pair of locations on earth using signals transmitted from the GPS satellites, in which the radio signals received at each location are precisely time tagged and then transmitted over telephone lines to a central location where a near real time phase comparison is made by crosscorrelating the two sets of signals. The system illustrated in the patent includes "dish" reflector type receiving antennas. Because the radio flux density of a GPS signal is small relative to the background noise level and because the bandwidth of a GPS signal greatly exceeds the bandwidth of a telephone line, the signal to noise ratio of the power transmitted over the telephone line from each location is small. It is largely for the purpose of raising this signal to noise ratio to a useful level that "dish" type antennas with large collecting areas are used in this system. Another important reason for the use of such antennas is that they are directive, so that signals arriving at the antenna otherwise than directly from the desired source are rejected.

Systems of measuring baselines vectors using other kinds of signals from Earth orbiting satellites are also known.

In an article entitled "Miniature Interferometer Terminals for Earth Surveying" (MITES), appearing in Bulletin Geodesique, Volume 53 (1979), pp. 139–163, by Charles C. Counselman III and Irwin I. Shapiro, there is described a proposed system for measuring baseline vectors using multi-frequency radio signals which would be broadcast from earth orbiting satellites, in which system the phases of the signals received are determined separately at each end of the baseline. That is, the signal received at one location is not crosscorrelated with the signal received at the other in order to determine the phase difference between the two signals. To resolve the phase ambiguity, the MITES system relies upon the combination of measurements at a set of up to ten frequencies suitably spaced between 1 and 2 GHz. Unfortunately, as far as is known, there are no satellites presently orbiting the earth which emit such signals.

Systems for measuring relative position using signals transmitted from sources other than artificial satellites are also known. One example of such a system using a lunar based transmission is also disclosed in U.S. Pat. No. 4,170,776.

Systems for measuring either a single position or a relative position using signals from sources other than orbiting satellites are also known. For example in an article by W. O. Henry, entitled "Some Developments in Loran," appearing in the Journal of Geophysical Research, vol. 65, pp. 506-513, Feb. 1960, there is described a system for determining a position (such as that of a ship at sea) using signals from ground based (stationary) transmitters. The system, known as the Loran-C navigation system, employs several-thousand-kilometer-long chains of synchronized transmitters stationed on the surface of the earth, with all transmitters using the same carrier frequency, 100 kiloHertz, and with each transmitter being modulated in amplitude by a unique, periodic, pattern of pulses. This pattern, which includes signal reversals of the amplitude, enables the receiver to distinguish between signals from different transmitters. A suitable combination of observations of more than one pair of transmitters can yield a determination of the receiver's position on the surface of the earth.

Another example of a system of this type is the Omega system which is described in an article by Pierce, entitled "Omega," appearing in IEEE Transactions on Aerospace and Electronic Systems, vol. AES-1, no. 3, pp. 206-215, Dec. 1965. In the omega system, the phase differences of the signals received are measured rather than principally the group delays as in the Loran-C system. Because the frequencies employed in both the Loran-C and the Omega systems are very low, accuracies in position measurements with these systems are quite poor in comparison with the satellite systems mentioned.

The prior art also includes other methods of determining position and relative position by means of the Global Positioning System. The standard method, described for example in an article in Navigation, Volume 25, no. 2, (1978), pp. 121-146, by J. J.; Spilker, Jr., and further described in several other articles appearing in the same issue of that journal, is based on measurements of the differences between the group delays, or the "time," of reception of the coded modulation of the GPS signals. In principle this method is a hyperbolic positioning method and is essentially similar to that of LORAN. The approximately 10 MHz bandwidth of the GPS modulation limits the accuracy of group-delay measurements and hence of position determination by the standard method to several tens of centimeters. Accuracy of the order of one centimeter is potentially available through the use of carrier phase measurements, as described for example in an article by J. D. Bossler, C. M. Goad, and P. L. Bender, entitled "Using the Global Positioning System for Geodetic Positioning," appearing in Bulletin Geosesique, vol. 54, no. 4, p. 553 (1980). However, every published method of using the GPS carrier phase for position determination has the disadvantage of requiring knowledge and use of the code modulation, which may be encrypted, or of requiring crosscorrelation of signals received at different locations, or of requiring the use of large antennas to raise the received signal to noise ratio and to suppress interference from reflected signals, or else the method suffers from more than one of these disadvantages. The present invention has none of these disadvantages.

In particular, the present invention requires no knowledge of the codes which modulate the GPS carriers, does not require crosscorrelation of a signal received at one location with a signal received at any other location, and does not require the use of a large or highly directional receiving antenna.

SUMMARY OF THE INVENTION

It is an object of this invention to provide a method and system for determining position by radio.

It is another object of this invention to provide a method and system for measuring the baseline vector between a pair of points by radio interferometry.

It is still another object of this invention to provide a method and system for determining the baseline vector between a pair of points on the earth, such as survey marks, using radio signals of the double sideband, suppressed carrier, type broadcast from earth orbiting satellites of the Global Positioning System.

It is a further object of this invention to provide a method and system for determining the baseline vector between a pair of survey marks using radio signals from earth orbiting satellites of the Global Positioning System which determination involves measuring the phases of the carrier waves implicit in the signals received at each survey mark.

It is still a further object of this invention to provide a technique for processing phase information derived at two locations on earth from radio signals received from different directions, to determine relative position.

It is still a further object of this invention to provide a method and system for measuring the powers and the carrier-wave phases of the radio signals received from satellites of the Global Positioning System without knowledge of the coded signal which, in transmitters of these satellites, modulate the carrier waves.

It is still a further object of this invention to provide a method and system for determining the baseline vector between two points by measuring the phases of radio signals received at each point without crosscorrelating the signal received at one point with the signal received at the other point, without recording the signal received at the other point, without recording the signal received at either point, and without otherwise transponding as signal from one point to the other or from both points to a common location.

It is still a further object of this invention to provide a method and system for determining position by radio without requiring the use of a directional antenna.

The method of measuring a baseline vector between a pair of points on Earth by radio interferometry using radio signals broadcast by GPS satellites according to the principles of the present invention comprises measuring the implicit carrier phases of the signals received from the satellites at each end of the baseline and then processing the phase information from both locations together to determine the baseline vector. The system for measuring a baseline vector between a pair of points on earth by radio interferometry using radio signals broadcast by GPS satellites according to the principles of the present invention comprises a pair of interferometer field terminals, one interferometer field terminal adapted to be positioned at each point, each interferometer field terminal including an antenna, an upper and lower sideband separator, a plurality of correlators and numerical oscillators, and a field terminal computer.

BRIEF DESCRIPTION OF THE DRAWINGS

In the drawings wherein like reference numerals represent like parts.

DETAILED DESCRIPTION OF PREFERRED EMBODIMENTS

Figure 1:
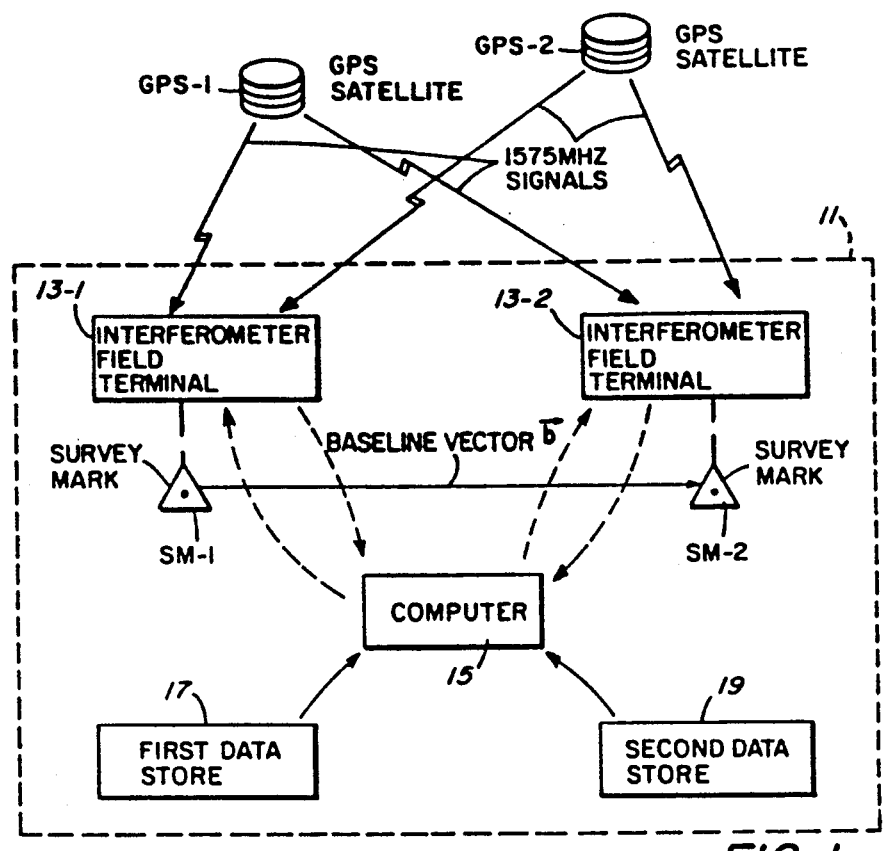
FIG. 1 illustrates a system for determining a baseline vector by radio interferometry with GPS satellites according to the principles of the present invention.

The present invention is directed to a technique for measuring the baseline vector between a pair of points, such as survey marks, on Earth by radio interferometry using the double-sideband, suppressed-carrier, radio signals transmitted by Earth orbiting satellites of the NAVSTAR Global Positioning Systems (GPS). The technique involves measuring the phases of the carrier waves implicit in the signals received at each location, and then processing the phase information obtained at both locations to determine the baseline vector. One advantage of the technique is that it measures the carrier phases without reference to knowledge of the coded signals that are used in the satellites to modulate the carriers. Another advantage is that it does not require transmission of the received signals, either in real time or by transportation of recordings, from two locations to a common location. Another advantage is that it does not require the use of large or highly directional antennas. Still another advantage is that it is relatively immune to errors caused by scattering and reflections of radio waves occurring close to the receiving antennas.

Although the invention will hereinafter be described specifically for use with GPS satellites it is to be understood that certain aspects thereof are not limited solely to use with such satellites and may be useful with signals received from other sources.

As is known, satellites of the NAVSTAR Global Positioning System (GPS) orbit the earth at approximately 20,000 kilometers altitude and transmit signals in a frequency band centered at 1575.42 MHz, known as the "L1" band, and signals in a secondary band centered at 1227.60 MHz, known as the "L2" band. The signals are modulated such that nearly a symmetrical upper and lower sidebands are generated with the carrier completely suppressed.

For either band, the signal from a given satellite received at a given location may be considered, as a function of time, to have the form:

$$s(t) = m(t) \cos(2\pi f_o t + \phi) + n(t) \sin(2\pi f_o t + \phi)$$

in which m(t) and n(t) are modulating functions, each a realvalued function of time; $f_o$ is the nominal carrier frequency, equal to 1575.42 MHz for L1 and 1227.60 MHz for the L2 band; and $\phi$ is the received carrier phase, in radians, which is unknown and to be determined. Each of the modulating functions, m(t) and n(t), is a pseudo-random function of time, with zero mean. The two functions are mutually orthogonal. Each of the functions used for the modulation of the L1 carrier for any one satellite is also orthogonal to the corresponding function used for every other satellite, although for a given satellite the same m(t) or n(t) function, or both, may be used to modulate both the L1 and the L2 carriers. The bandwidths of the two functions, m(t) and n(t), differ by a factor of exactly 10, with m(t) having the narrower, and n(t) the wider, bandwidth. Usually at L1 both m(t) and n(t) signal components are present, and at L2 only the n(t) component is present, the m(t) function being set to zero, or "turned off." The power spectral density of m(t), which corresponds to the modulating signal that is known in the GPS literature as the "clear-/acquisition" code, is proportional to the function $$\frac{\sin^2(\pi F/1.023 \text{ MHz})}{(\pi F/1.023 \text{ MHz})^2}$$

where F represents modulation frequency. This function has a half width at half maximum of approximately 450 kHz. That is, the function value is approximately 0.5 for F=±450 kHz, whereas the value is unity for F=0. The power spectral density of n(t), which corresponds to the modulating signal that is known in the GPS literature as the "precise code" or "P code," is proportional to $$\frac{\sin^2(\pi F/10.23 \text{ MHz})}{(\pi F/10.23 \text{ MHz})^2}$$

Thus, the half width at half maximum of the power spectral density of n(t) is approximately 4.5 MHz.

For the L1, 1575.42 MHz, signal, the mean-squared value of n(t) is ordinarily equal to one-half that of m(t); that is $$<n^2(t)> = 0.5 <m^2(t)>.$$

(It is possible for a GPS satellite to be operated in extraordinary modes in which the ratio of mean-square values, or power ratio, is different from 0.5; in particular, a value of zero is possible.) Thus, the ratio of the power spectral density of n(t) to that of m(t) is ordinarily equal to around 0.5÷10=0.05 for a value of F near zero, so that if a bandpass filter matched to the spectrum of m(t) is centered on the L1 carrier frequency, about 90 percent of the power contained in the output of this filter will stem from the m(t) signal component, and less than 10% will stem from the n(t) component. For simplicity in the remainder of this description, therefore, it will be assumed that the GPS L1 signal has no n(t) component and has the simpler form:

$$s(t) = m(t) \cos(2\pi f_o t + \phi).$$

In general, the received carrier phase, $\phi$, is a slowly varying function of time, so the actual received carrier frequency is given by the algebraic sum:

$$f = f_o + (2\pi)^{-1}(d\phi/dt),$$

where $f_o$ is the nominal carrier frequency and $d\phi/dt$ is the time-derivative of $\phi$. By "slowly varying," it is meant that $(2\pi)^{-1}(d\phi/dt)$ is very small in comparison with $f_o$ and with the bandwidth of m(t). The main reason for the time-variation of $\phi$ is Doppler shift, which may cause f to diffuse from $f_o$ by plus or minus up to about 4.5 kHz.

The received signal s(t) contains no discrete spectral component of power at the carrier frequency because the mean value of m(t) is zero. Thus, the carrier is completely suppressed and the power spectral density function of the L1 signal s(t) is equal to the power spectral density function of the modulation m(t), translated from baseband to the received carrier frequency f. Because m(t) is a real-valued function of time, its power spectral density is an even-symmetric function of frequency. Thus, the power spectral density of s(t) has even symmetry with respect to the carrier frequency f, and is said to be a double-sideband spectrum. The portion of this power spectrum corresponding to frequencies greater than f is called the upper sideband; the portion corresponding to lower frequencies is the lower sideband. [The slight asymmetry, at most about 3 parts in $10^6$, between the upper and the lower sidebands due to Doppler "stretching" of the signal is not significant here.]

According to the present invention, an antenna is positioned at each end of a baseline vector. The signals received by each antenna are separated into upper and lower sideband components. These separate components are filtered, converted to one-bit digital form, and then multiplied together. Their product is analyzed digitally by means of correlation with quadrature outputs of a local oscillator to determine the power, and the phase relative to that local oscillator, of the carrier wave that is implicit in the double-sideband signal being received from each satellite. Differences in Doppler shift are utilized to distinguish the carrier of different satellites. Thus, the power and carrier phases of the signals from a plurality of satellites are measured simultaneously and numerical data representing the measurement results are obtained at each survey mark. The measurements are performed in real time at each mark without reference to signals that are received at any other place and without knowledge of any of the coded signals that modulate the GPS carriers. The data from the measurements performed simultaneously but independently at two survey marks, once per second for a time span of sufficient duration, such as about 5,000 seconds, are then processed together to determine the baseline vector that extends from one mark to the other. Two methods of processing are disclosed. In either method, an "ambiguity function" is computed which is a function of the measurement data and of a trial value b of the baseline vector. The vector space of b is systematically searched to find the unique value of b that maximizes the computed function. This value of b is taken to be the desired determination of the unknown baseline vector b.

Referring now to FIG. 1, there is illustrated a system 11 for determining a baseline vector b according to the present invention. The baseline vector b, which is also referred to hereinafter sometimes by the name "baseline," is the relative position vector of one survey mark SM-1 with respect to another mark SM-2. The baseline extends from survey mark SM-1 which is at the origin or one end of the baseline, to survey mark SM-2 which is at the terminus or other end of the baseline. The system 11 comprises two intelligent interferometer field terminals 13-1 and 13-2, one placed at each end of the baseline, and a computer which may be structurally and functionally incorporated into and be part of one of the terminals 13 or may be a separate unit 15 as shown.

The system requires for its usual operation certain numerical data from external sources. It also requires some means of transferring numerical data between the computer 15 and each terminal 13 before and after, or (optionally) during performance of baseline measurements.

Before measurements to determine the baseline are begun, data from a first data store 17 representative of the orbits of a plurality of GPS satellites of which two, identified GPS-1 and GPS-2, are shown for illustrative purposes is entered into the computer 15, together with approximate data representative of the locations of the survey marks SM-1 and SM-2 which is obtained from a second data store 19. The latter data might, for example, represent the survey mark locations within a few kilometers accuracy. From these satellite orbital and survey location data computer 15 generates, in tabular form as a function of time, a prediction of the Doppler frequency shift that the 1575.42 MHz signal transmitted by each GPS satellite will have as its is received at each survey mark. Computer 15 also generates a tabular prediction of the power level of the signal to be received from each satellite at each mark. The predicted power is zero if the satellite will be below the horizon; and it is a function of the predicted angle of elevation of the satellite above the horizon, due to the angular dependence of the gain of a receiving antenna (at the mark) and, usually to a lesser extent, of the transmitting antenna (on the satellite). The tables of predicted frequency shifts and powers, for a span of time encompassing that of the anticipated measurements, for all GPS satellites expected to be visible at each survey mark, are now communicated by any known means, such as for example by telephone or radiotelephone link to, and entered into the the memory of, a smaller computer contained within the particular interferometer field terminal 13 that will be, or may already have been, placed at that survey mark. Alternately the frequency and power prediction tables may be generated by the computer inside the interferometer field terminal.

The Doppler frequency predictions are computed according to formulas that are well known in the art. The magnitudes of the errors in such predictions are of the order of 1 Hertz per kilometer of error in the assumed location of the survey mark. The additional error in the frequency prediction due to error in the extrapolation of the satellite orbit is normally of the order of 1

Hertz or less for predictions made at least a day in advance. Frequency prediction errors of up to several Hertz are tolerable in the context of the present invention. The predictions of received power do not need to be very accurate; errors of several decibels would be tolerable, because these predictions are not used for any very critical purpose. They serve mainly to enable the field terminal computer to check whether the desired signal, not some spurious signal, is being received. At perhaps some sacrifice in reliability, the power prediction tables could be eliminated.

An interferometer field terminal 13, having been placed at a survey mark, now receives the 1575.42 MHz signals from a plurality of satellites, up to seven but in no case fewer than two satellites, simultaneously. For an accurate determination of the baseline to be obtained, it is essential for the terminals at both ends of the baseline to observe the satellites concurrently.

Electronic circuits (hereinafter to be described) within each terminal separate the received signals into upper and lower sideband components and, using the predictions of Doppler frequency shift, analyze these sideband components to determine the power and the phase of the carrier wave implicit in the signal received from each satellite. Data from these power and phase determinations is stored within the field terminal and eventually returned to the central computer 15 by any conventional means.

The data from the two interferometer field terminals 13-1 and 13-2 must be processed together to obtain an accurate determination of the baseline vector.

It should be noted that means for long-distance communication or transfer of data are not necessary for the operation of this system. The terminals 13-1 and 13-2 may be physically transported to the same location as computer 15, and there the prediction tables may be transferred from computer 15 to the terminals 13. Then the terminals 13, containing the tables in their memories, may be carried to the survey marks SM-1 and SM-2 where the satellites are observed. Following the completion of these observations the terminals 13 may be carried back to the location of the computer 15 where the carrier phase data may be transferred from both terminals to the computer for processing.

Figure 2:
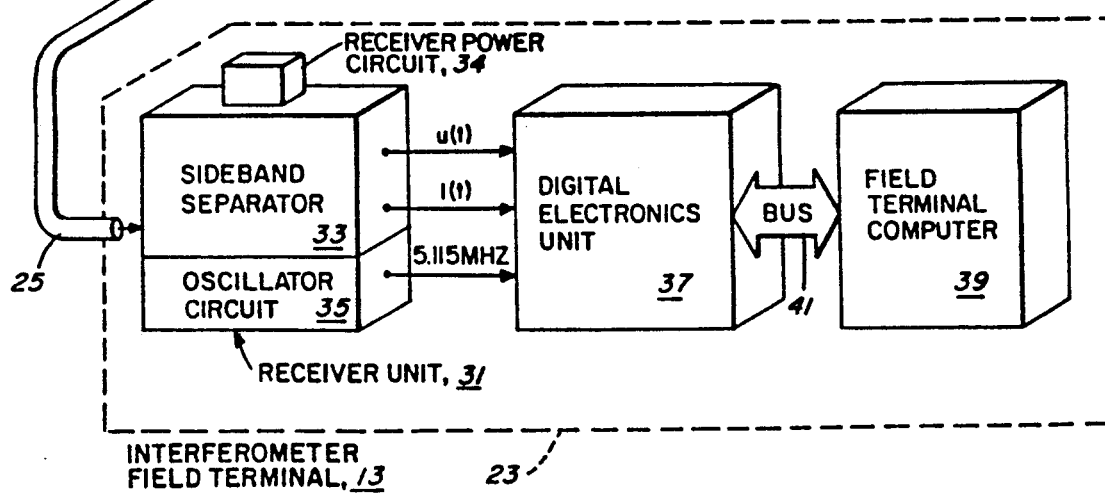
FIG. 2 is a block diagram of one of the interferometer field terminals shown in FIG. 1.

Referring now to FIG. 2, there is illustrated the major components of an interferometer terminal 13, also called the "field terminal." Each field terminal 13 has an antenna assembly 21 connected to an electronics assembly 23 by means of a coaxial cable 25.

Each antenna assembly 21 includes an antenna 27 and a preamplifier assembly 29. The antenna is positioned on the survey mark SM, and may be constructed like the antenna which is described in U.S. patent application Ser. No. 323328 filed on Nov. 20, 1981. Regardless of the manner of construction, the location of the phase center of the antenna 27 with respect to the survey mark SM must be accurately known. The antenna described in said patent application is satisfactory in this respect; the uncertainty in the positioning of its phase center being a few millimeters at most.

Antenna 27 receives the 1575.42 MHz radio signals that are transmitted by the GPS satellites. The received signals are amplified by the preamplifier 29 and fed through the coaxial cable 25 to a receiver unit 31 contained in the electronics assembly 23, the receiver unit 31 including a sideband separator 33, a receiver power circuit 34, and an oscillator circuit 35.

In the sideband separator 33 the upper sideband portion of the signals, comprising that portion of the signals received from all satellites combined which occupies a range of radio frequencies extending upward from 1575.42 MHz, is separated from the lower sideband portion, which corresponds to radio frequencies below 1575.42 MHz. To effect this separation, the sideband separator 33 uses a 1575.42 MHz reference signal which is supplied by the oscillator circuit 35.

The receiver unit 31 furnishes three signals, in analog form, to a digital electronics unit 37. One analog signal, designated u(t), represents the upper sideband component of the received radio frequency signals, translated to baseband. The second analog signal, designated l(t), represents the lower sideband component, also translated to baseband. Each of these two signals contains contributions from all visible satellites. The third signal furnished to the digital electronics unit 37 is a sinusoidal signal frequency of 5.115 MHz which is the output of a free-running, stable, quartz crystal oscillator in the oscillator circuit 35. The output of this same oscillator is multiplied in frequency by a fixed integer factor of 308 within the oscillator assembly to obtain the reference frequency of 1575.42 MHz used by the sideband separator. The accuracy of the frequencies generated by oscillator assembly 35 is typically around one part in $10^9$, although accuracy of one part in $10^8$ would be tolerable.

In the digital electronics unit 37 each of the three analog inputs is converted to a digital-logical signal. The digital signals are processed under the control of a field terminal computer 39 to generate the carrier power and phase data. The digital electronics assembly 37 is connected to the field terminal computer 39 by means of a bidirectional data bus 41. Field terminal computer 39 may be a Digital Equipment Corporation (DEC) model LSI-11/2 microcomputer; the data bus 41 in this case may be the DEC "Q" bus.

The carrier phase data is stored in the memory of the field terminal computer 39 until it is desired to communicate these data to the central computer 15 for processing. As noted, the central computer 15 may be eliminated and the processing performed in one of the field terminal computers 39. The phase data may also be written out by the field computer 39 onto a data storage medium such as a magnetic tape cassette or a disk (not shown). The data may also be communicated via direct electrical connection, or via a modem and telephone connection, or by many other standard means.

Figure 3:
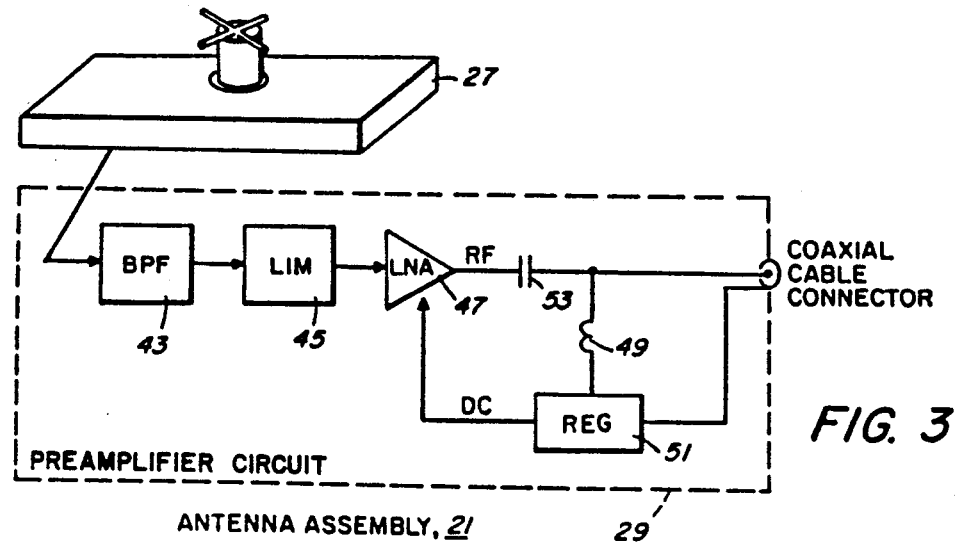
FIG. 3 is a block diagram of the antenna assembly shown in FIG. 2.

Now referring to FIG. 3, there is shown in further detail the components of the antenna assembly 21. Assembly 21 includes an antenna 27 which, as mentioned, is constructed so that its phase center can be accurately positioned with respect to the survey mark. The 1575.42 MHz radio signals received by antenna 27 are fed to the preamplifier circuit 29 whose function is to raise their power level sufficiently to overcome the attenuation of the coaxial cable 25 that connects the antenna assembly 21 to the receiver unit 31, and to overcome the background noise that is generated within the input amplifier in the receiver unit 31.

In the preamplifier circuit 29 the signals received from antenna 27 are first filtered by a bandpass filter 43 of approximately 50 MHz bandwidth centered on 1575.42 MHz. The function of filter 43 is to prevent overloading of receiver assembly 31 by strong spurious signals that may be present outside the GPS signal band. The output of bandpass filter 43 is fed into a passive diode limiter 45 which serves to protect a low-noise amplifier 47 from being burned out by any very strong signals such as those that might be radiated by nearby high power radars. The low-noise amplifier 47 is a standard Gallium-Arsenide field-effect-transistor (FET) amplifier with a noise figure of about 2 db.

D.c. power for the low noise amplifier is supplied via the coaxial cable 25 connected to the preamplifier assembly 29 from the receiver assembly 31, through a radio-frequency choke 49 and a voltage regulator 51. A capacitor 53 couples the radio-frequency output of the low noise amplifier 47 to the cable 25 while blocking the d.c. from the amplifier.

Figure 4:
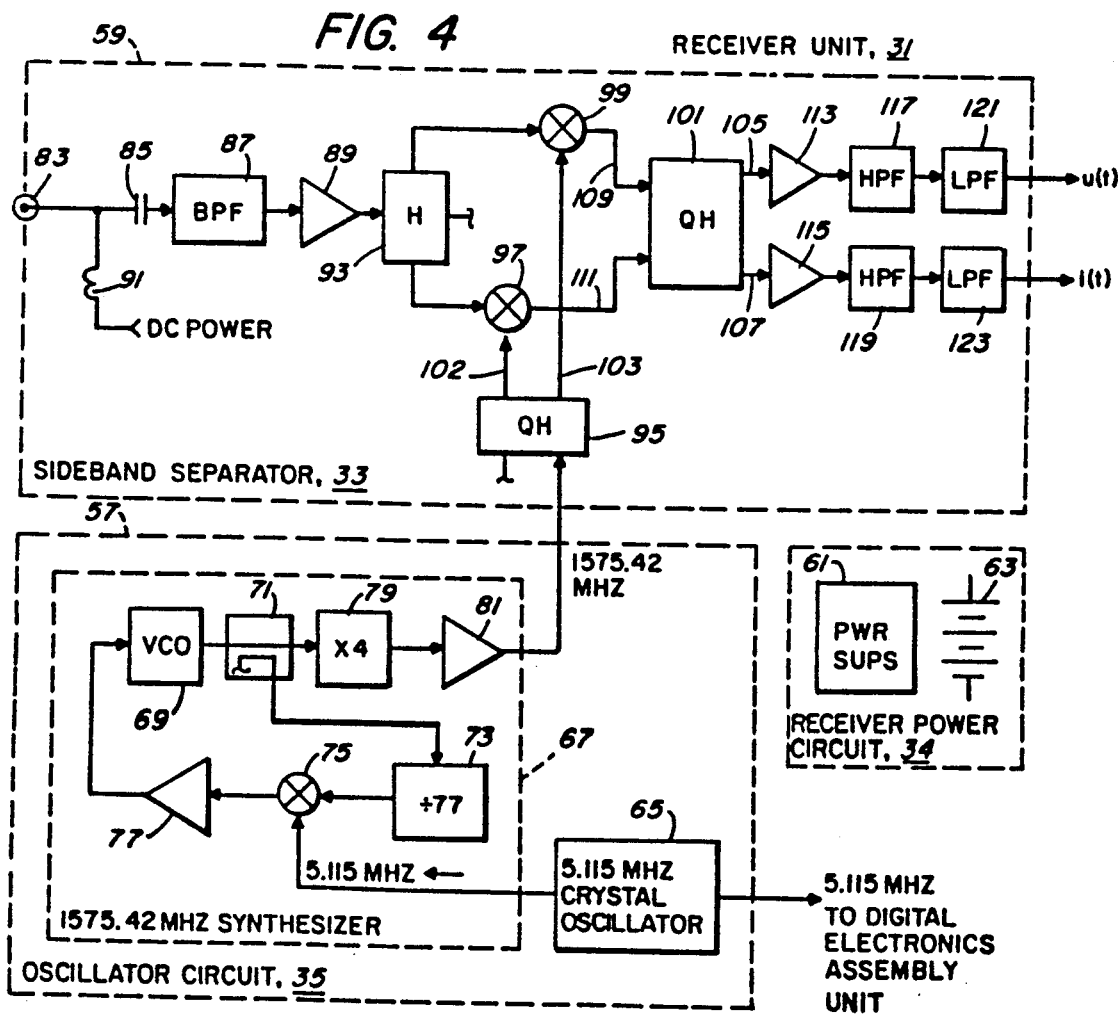
FIG. 4 is a block diagram of the receiver unit shown in FIG. 2.

Referring to FIG. 4, there is shown in more detail the components of the receiver unit 31. The receiver unit 31 includes a receiver power circuit 34, a sideband separator 33 and an oscillator circuit 35. The receiver power circuit 34 provides d.c. power for the operation of the oscillator assembly 35, the sideband separator 33, and, through the coaxial cable 25, the low noise amplifier 47 in the antenna assembly 21. The oscillator circuit 33 provides a reference frequency of 1575.42 MHz to the sideband separator 33 and a reference frequency of 5.115 MHz to the digital electronic assembly 37. The sideband separator 33 separates the signals that are received in a radio frequency band centered on 1575.42 MHz and extending upward and downward from this frequency, into separate upper and lower sideband components at baseband.

The receiver power circuit 34 contains regulated d.c. power supplies 61 and, in addition, a storage battery 63. The battery 63 enables power to be supplied without interruption to the crystal oscillator 65 in the oscillator circuit 35, to the real-time clock in the digital electronics assembly 37, and to the data memory of the field terminal computer 39, despite interruptions of the main, external, source of electrical power that may occur. Thus, the frequency stability of the oscillator will be maintained, the clock epoch setting will not be lost, and data stored in the computer memory will not be lost.

The oscillator 65 in the oscillator circuit 35 is a quartz crystal oscillator, such as a Frequency and Time Systems (FTS) model 1001, which provides an output frequency of 5.115 MHz within one part in $10^8$ or less. The FTS model 1001 has stability of about one part in $10^{10}$ per day and one part in $10^{12}$ over time intervals of from 1 to 100 seconds, and is therefore more than adequate in this application. Oscillator 65 provides two identical outputs, one which goes to the digital electronics unit 37, and the other which goes to a 1575.42 MHz synthesizer 67 in the oscillator circuit 35.

The 1575.42 MHz synthesizer 67 contains a voltage-controlled transistor oscillator (VCO) 69 which oscillates at a frequency of 393.855 MHz, equal to 77 times 5.115 MHz. This oscillator's phase is stabilized with respect to the phase of the 5.115 MHz reference through the action of a phase-locking loop comprised of the VCO 69, a coupler 71, a divider 73, a phase-frequency error detector 75, and a loop filter 77. Part of the VCO 69 output power is coupled by the coupler 71 to the input of the frequency divider 73 which is comprised of standard emitter-coupled-logic (ECL) integrated circuits that divide by 11 and then by 7. The output of divider 73 is the "variable" input and the 5.115 MHz output of oscillator 65 is the "reference" input to the standard ECL integrated-circuit phase-frequency detector 75 such as Motorola type number MC12040. The output of the detector 75 is low-pass filtered in loop filter 77 to obtain the control voltage which is input to the VCO 69. The output of VCO 69 is quadrupled in frequency by a succession of two standard, balanced, diode doublers 79 and amplifier by an amplifier 81 to obtain the 1575.42 MHz output frequency which drives the sideband separator 33.

The signals in a band centered on 1575.42 MHz, received from antenna assembly 21 through the coaxial cable 25 at the input 83 of the sideband separator 59 are coupled by a d.c. blocking capacitor 85 through a bandpass filter 87 and amplified by an input amplifier 89. D.c. power for the preamplifier 29 (in the antenna assembly) is coupled to the coaxial cable 25 through a radio-frequency choke 91 from the receiver power assembly 55.

The r.f. power-splitter, or "hybrid" 93, the 1575.42 MHz local-oscillator quadrature hybrid 95, the two doubly-balanced mixers 97 and 99, and the broadband video-frequency quadrature hybrid 101 in the sideband separator 59 comprise a dual, single-sideband, radio-frequency-to-baseband converter or "demodulator" of the conventional, "phasing" type. SUch a demodulator has been described, for example, in an article in the Proceedings of the IEEE, vol. 59 (1971), pp. 1617–1618, by Alan E. E. Rogers. Its operation here may be described as follows.

Let $f_o$ denote the frequency of the reference signal furnished to the sideband separator 33 by the oscillator circuit 35. Nominally, $f_o$ equal 1575.42 MHz, which equals the nominal carrier frequency of the GPS satellite "L1" transmissions, before (first-order) Doppler shift. Then the outputs 102 and 103 of the quadrature hybrid 95 may be written as $\sin 2\pi f_o t$ and $\cos 2\pi f_o t$, respectively. These outputs, which are in phase quadrature, are the "local oscillator" inputs to mixers are identical. The baseband outputs of the mixers are accordingly identical except for a phase shift of $\pi/2$ radians. (By "baseband" we refer to the range of frequencies, nearer to zero than to $f_o$, that corresponds to the difference between the input frequency and $f_o$.) The sense of this phase shift, leading or lagging, depends on whether the input signal frequency is above or below $f_o$. Thus it is possible to select either upper-sideband (input frequency higher) or lower-sideband inputs and to reject the opposite sideband by shifting the phase of one mixer output by an additional $\pi/2$ radians, and then either adding or subtracting (depending on which sideband is desired) the two mixer outputs.

The quadrature hybrid 101, which has two inputs 109 and 111 and two outputs 105 and 107, performs this $\pi/2$ phase shift and addition/subtraction. The upper output 105 of the hybrid 101 is given by the arithmetic sum of the upper input 109, plus the lower input 111, both inputs having been delayed in phase by an amount that is dependent on frequency, but with the phase shift of the lower input greater than that of the upper input of a constant $\pi/2$ radians, independent of frequency. The lower output 107 is given by the arithmetic difference of the same two differentially phase-shifted inputs 109 and 111, with the difference being taken in the sense: upper minus lower. The specified, $\pi/2$ radian (one-quarter cycle), phase difference is accurately maintained for all frequencies between $f_{HP}$ and at least $f_{LP}$, where $f_{HP} \approx 10$ kHz is much smaller than $f_{LP} \approx 450$ kHz, and $f_{LP}$ is approximately equal to the one-sided bandwidth of the GPS "C/A" modulation m(t), as previously discussed. The design of a quadrature hybrid having these properties is given in the cited article by Rogers.

Now the outputs of the quadrature hybrid 101 are separately amplified by identical video amplifiers 113 and 115, and filtered by high-pass 117 and 119 and low-pass 121 and 123 filters. Filters 117 and 119 are identical high-pass filters with low-frequency cutoff at $f_{HP}$. The purpose of the high-pass filters 117 and 119 is to eliminate the direct-current components and any low-frequency spectral components of the mixer outputs with frequencies similar to, or lower than, the maximum possible magnitude of Doppler shift that a GPS satellite signal might have.

It is desired to reject any such components because otherwise they could interfere with the subsequent determination, in the signal electronics assembly and computer of the field terminal, of the received, Doppler-shifted, carrier phase. Such potentially interfering signals might include low-frequency "flicker" noise generated in the mixers themselves, or might result from a combination of mixer imbalance and (undesired) low-frequency amplitude for phase fluctuations of the 1575.42 MHz reference signal or of the gain of any radio-frequency signal amplifiers preceding the mixers. Another potential source of low-frequency interference is "hum" or ripple on power-supply output voltages or currents. Another source could be an interfering continuous-wave signal close in frequency to $f_o$.

Low pass filters 121 and 123 are identical low-pass filters with bandwidth equal to $f_{LP}$, equal to the one-sided bandwidth of m(t). The response of each filter, as a function of frequency, is tailored to match the power spectral density of m(t). The purpose of these filters is to reject noise and interference outside the bandwidth of m(t). Note that the wide bandwidth GPS "P code" modulation signal n(t) here would normally constitute a source of interference. Most, approximately 80 percent, of the power stemming from n(t) is rejected by these low-pass filters. This degree of rejection is sufficient to ensure that the "P code" interference has a negligible effect. We note, however, that if the narrowband, m(t), modulation were turned off in the GPS satellites, then the wideband n(t) modulation would no longer represent an undesired, interfering, signal; it would become the desired signal. Such a switch in the GPS signal structure could be accommodated by increasing the bandwidths of the low-pass filters 35 by a factor of 10, to match them to the new "signal."

The output, u(t), from low pass filter 121 represents the down-converted and filtered, upper sideband component of the original signal s(t); and the output l(t) from low pass filter 123 represents the lower sideband. It should be noted that the spectrum of u(t) will be shifted upward in frequency, and the spectrum of l(t) will be shifted downward in frequency, relative to the spectrum of the original modulation m(t) by an amount equal to $(f - f_o)$, the difference between the actual receiver carrier frequency f and the local oscillator frequency $f_o$. [If the Doppler shift of the carrier, $(f - f_o)$, is negative, then the u(t) spectrum is shifted downward and l(t), upward.] The magnitude of this shift is assumed to be smaller than $f_{HP}$, and much smaller than $f_{LP}$. This assumption will be satisfied if the frequency shift arises primarily from Doppler shift, which can never exceed 5 kiloHertz in magnitude, provided that $f_{HP}$ is set approximately equal to 10 kHz. Any offset of the frequency of the reference crystal oscillator 65 from the desired, 5.115 MHz, frequency will cause a (308 times greater) shift of the u(t) and l(t) spectra, too. Normally, however, such a shift will be very much smaller than $f_{HP}$.

In addition to the frequency shift of the upper and lower sideband outputs u(t) and l(t), there is a frequency-dependent, dispersive, phase shift of each output due to the quadrature hybrid 101. However, for the particular quadrature hybrid design of Roges (op. cit.), this phase shift is too small to be important. Similarly, the additional phase shifts introduce by the bandpass filter 87 and the high and low pass filters 117, 119, 121, and 123, will be trivial if standard filter designs are employed. Each of these effects also tends to cancel when the difference between terminals is taken in the subsequent data processing. The cancellation is not exact because no two filters are ever exactly the same; also, the Doppler shifts at different sites are different at any given time. However, the residual effects are negligible, as has been shown by direct calculation and confirmed by actual experiment.

Figure 5:
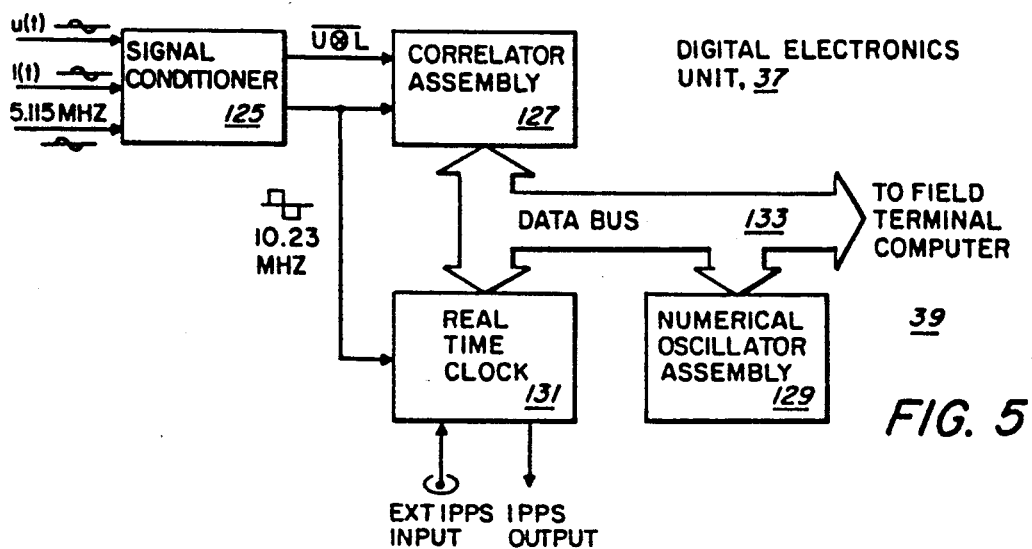
FIG. 5 is a block diagram of the digital electronics unit shown in FIG. 2.

Now referring to FIG. 5, there is shown a block diagram of the digital electronics unit 37. The digital electronics unit 37 includes a signal conditioner 125, a correlator assembly 127 comprising a set of seven identical correlators, a numerical oscillator assembly 129 comprising a corresponding set of seven identical numerical oscillators, and a real-time clock 131, with the correlator assembly 127, the numerical oscillator assembly 129 and the real time clock 131 being connected by a data bus 133 to one another and to the field terminal computer 39. The first function of the signal conditioner 125 is to convert the analog upper-sideband signal u(t), the analog lower-sideband signal l(t), and the analog 5.115 MHz sinusoidal signal each to a binary-valued "digital" or "logic" signal that is suitable for processing by conventional transistor-transistor logic (TTL) circuits.

The signal conditioner 125 produces just two outputs. One is a binary-valued, TTL-logic-level, square, periodic waveform with a frequency of 10.23 MHz, produced by frequency-doubling the 5.115 MHz input. This 10.23 MHz output serves as a "clock" signal to control the timing of all of the subsequent, digital, circuits. This clock signal is divided by 1023 $(= 3 \times 11 \times 31)$ in the real-time clock 131 to obtain one tick per 100 microseconds; further divisions by successive factors of 10 then yield a complete decimal representation of the time in seconds, with the least significant digit representing units of $10^{-4}$ seconds. The time is always readable in this form via the data bus 133. The operations of the correlator assembly 127, the numerical oscillator assembly 129, and the field terminal computer 39 are all governed by the real-time clock 131 through the data bus 133.

The second "digital" output of the signal conditioner 125 is derived from the analog u(t) and l(t) inputs, and is a binary-valued, TTL-logic-level, nonperiodic waveform. This output is produced by a TTL exclusive-nor logic gate which has two inputs: one input represents the sign of the u(t) input and the other, the sign of l(t). Thus the gate output is "True" (t, or binary 1) if and only if the analog u(t) and l(t) signals have the same sign.

Figure 6:
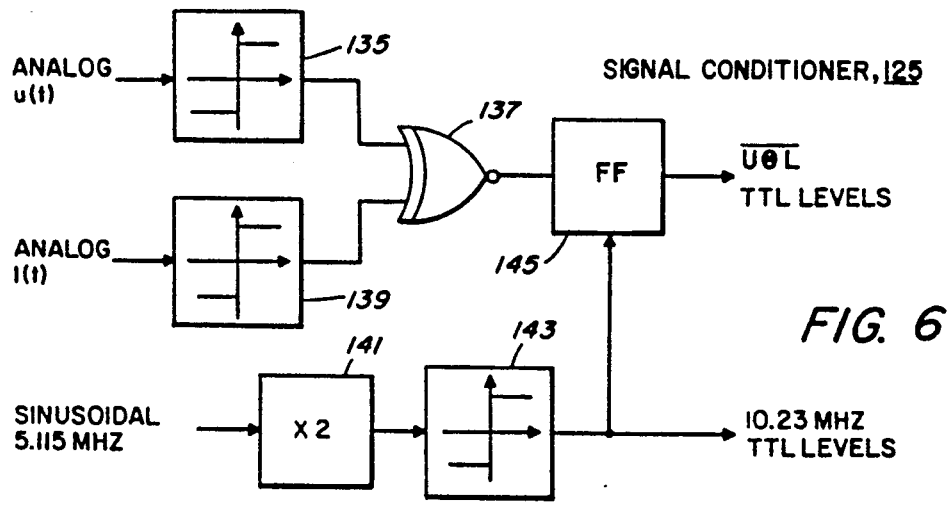
FIG. 6 is a block diagram of the signal conditioner shown in FIG. 5.

In FIG. 6 is shown a block diagram of the signal conditioner 125. The analog signal u(t) is input to a comparator 135 whose output is a TTL logic level, True when u(t) is positive and False when u(t) is negative. This TTL logic signal is applied as one input to an TTL exclusive-nor gate 137. The analog signal l(t) is similarly fed to a comparator 139 whose output is applied as the other input of the exclusive-nor gate 137.

The sinusoidal 5.115 MHz signal obtained from crystal oscillator 65 is input to a conventional analog frequency doubling circuit 141 whose output is fed to a third comparator 143 to produce a 10.23 MHz, square-wave, TTL-level output. The 10.23 MHz output is also used as the "clock" input to a flip-flop 145 which samples and holds the output from gate 137. Thus the output of flip-flop 145 is the exclusive-nor function of the signs of u(t) and l(t), sampled at a uniform rate of $10.23 \times 10^6$ times per second, and held between sampling times. It is well known in the art of radio interferometry, as discussed for example by J. M. Moran in an article appearing in Methods of Experimental Physics, vol. 12, part C, pp. 228–260, that the binary-valued function of time U L has a Fourier transform, or "spectrum," that is a good approximation, both in phase and in relative amplitude, to the Fourier spectrum of the analog product u(t)l(t). The accuracy of the approximation depends on the analog signals being random and Gaussian in character. Also, the correlation coefficient between the two inputs must be much smaller than 1 in magnitude. (In effect, the noise "dithers" out the nonlinearities of the comparators. The exclusive-nor gate 137 may be regarded as a multiplier, each of whose inputs has values of +1 and −1.) These conditions are well satisfied in the present system. Thus, in the following, the logic-level from flip-flop 145 is considered as representing simply the product u(t)l(t).

The U L "product" from the signal conditioner 125 is input in parallel to each of seven identical correlators in the correlator assembly 127.

Before describing the construction of the correlator assembly 127, its principles of operation will be briefly explained.

In each correlator, the u(t)l(t) product is correlated with binary approximations to sine and cosine functions of time that are generated by a corresponding one of the seven numerical oscillators. The frequency of the oscillator is controlled by the field terminal computer 39 according to the time indicated by the real-time clock 131. At any given time, the oscillator frequency is set equal to twice the predicted Doppler frequency shift of the 1575.42 MHz carrier wave transmitted by one of the satellites. One oscillator and one correlator are associated with each of the satellites in view, up to a maximum of seven satellites. (In principle, if more than seven satellites were ever in view, more numerical oscillators and correlators could be used in the system. In practice, seven is sufficient.) If the predicted Doppler shift is sufficiently close to the actual Doppler shift, then the outputs of the correlator will accurately measure the power and the phase of the signal from the one particular satellite for which the prediction was made, and will not be significantly affected by the presence of signals from other satellites which are different Doppler shifts.

In mathematical terms, the operation of one of the numerical oscillators and its associated correlator is described as follows: As a function of the time, t, indicated by the real time clock 131, the predicted Doppler frequency shift of the satellite's carrier is given by $f_p(t)$. The value of $f_p(t)$ is interpolated from the table of pre-computed values that was previously stored in the memory of the field terminal computer. The numerical oscillator generates two functions of time: $\cos[\phi_p(t)]$ and $\sin[2\phi_p(t)]$, in phase quadrature, wherein $\phi_p(t)$ represents a predicted phase which is a function of time. The function $\phi_p(t)$ is initially equal to zero at the time, $t_o$, when the numerical oscillator begins to oscillate; and at any subsequent time $\phi_p(t)$ is given by the integral $$\phi_p(t) = 2\pi \int_{t_o}^{t} f_p(t')dt'$$

where $f_p(t')$ represents the instantaneous value of $f_p$ at an intervening time $t'$. The factor of $20\pi$ is necessary if, as is customary, the frequency $f_p$ is measured in units of cycles per unit of time and the phase $\phi_p$ is supposed to be measured in units of radians rather than cycles.

Now the correlator, operating between times $t_0$ and $t_1$, forms quantities a and b from its inputs [u(t)l($\simeq$)], cos [$2\phi_p(t)$], and sin [$2\phi_p(t)$], according to the formulas $$a = \int_{t_0}^{t_1} u(t)l(t)\cos[2\phi_p(t)]dt$$

and $$b = \int_{t_0}^{t_1} u(t)l(t)\sin[2\phi_p(t)]dt.$$

The time interval of integration, $t_1 - t_0$, is equal to 1 second, and the indicated integrations are performed each second. At each 1-second tick from the real-time clock, the values of the integrals are "strobed" into storage registers, the integrations are reset to zero, the numerical oscillator is restarted, and a new integration period begins. Thus, at the end of each second of time, the correlator delivers outputs a and b which represent the time-averages, over the preceding one-second interval, of the product u(t)l(t) cos [$2\phi_p(t)$] and the product u(t)l(t) sin [$2\phi_p(t)$], respectively. These outputs represent the correlations of the product u(t)l(t) with the cosine and sine functions.

During the 1-second interval, the oscillator frequency $f_p(t)$ is updated every 0. 1 second by the computer, prompted by the 0.1-second "ticks" from the real-time clock. This updating is necessary because the satellite Doppler shift changes, due to the motion of the satellite relative to the field terminal on the ground, and the changing projection of the relative velocity along the line of sight, at a rate which may be a substantial fraction of 1 Hertz per second.

Now the correlator outputs a and b may be combined to obtain estimates of the power and the carrier phase of the signal from the particular satellite for which the prediction, $f_p(t)$, was made.

Define a complex number c whose real part is equal to a and whose imaginary part is equal to b. That is, $$c = a + jb$$

where j is the square root of minus one. Then $$c \simeq C <m^2> <\exp[2j(\phi - \phi_p)]>$$

where C is a positive, real constant scale factor; $<m^2>$ is the time average, over the integration interval from $t_0$ to $t_1$, of the square of the CPS modulating function m(t); and $<\exp[2j(\phi - \phi_p)]>$ is the time average, over the same interval, of the complex exponential function $\exp[2j(\phi - \phi_p)]$. Provided that the difference, $(\phi - \phi_p)$, between the received GPS carrier signal phase, $\phi = \phi(t)$, and the corresponding prediction, $\phi_p = \phi_p(t)$, does not vary by a substantial fraction of a cycle during the integration time, then the magnitude of c is approximately proportional to the average received power:

$$|c| = (a^2+b^2)^{\frac{1}{2}} \approx C<m^2>;$$

and the angle of c is approximately equal to twice the average phase difference, $(\phi - \phi_p)$:

$$\angle c = \tan^{-1}(b/a) \approx 2<(\phi - \phi_p)>.$$

Note that from b to a, the angle of c is determined uniquely, modulo $2\pi$ radians. Thus, the difference $(\phi - \phi_p)$ is determined modulo $\pi$ radians.

In order for the received signal power and carrier phase (modulo $\pi$) to be determined accurately from a and b according to these formulas, two conditions must be satisfied: first, as mentioned, the actual phase, $\phi(t)$, must differ from the predicted phase, $\phi_p(t)$, by an amount that changes by much less than a cycle during the one-second integration time; second, the correlation output signal to noise ratio, given by $$\begin{aligned} SNR_c &= (2/\pi)(\pi/4)(B_{eff}T_{int})^{\frac{1}{2}} F \\ &= (\tfrac{1}{2})(B_{eff}T_{int})^{\frac{1}{2}} F, \end{aligned}$$

must be much greater than one, where $B_{eff}$ is the effective bandwidth of the signals u(t) and l(t), equal to about $5 \times 10^5$ Hz; $T_{int}$ is the integration time, equal to 1 second, and F is the fraction of the power present in u(t) and l(t) that stems from the GPS m(t) signal, not from noise. The factor of $(2/\pi)$ accounts for the loss of correlation between u(t) and l(t) that is caused by the analog-to-digital conversion of these signals by the comparators in the signal conditioner. The factor of $(\pi/4)$ accounts for the loss associated with the use of square-wave approximations to the sine and cosine functions in the correlator. The square root of the $B_{eff}T_{int}$ product is equal to about 700. Therefore there is the relation:

$$SNR_c \approx 350 \cdot F.$$

The fraction, f, of either-sideband power stemming from the GPS satellite depends on the receiving antenna gain and the receiving system noise figure. For the "MITES" antenna and the receiving system described above, and for a satellite elevation angle above 20°, it is known from experiment that F exceeds about 0.03. Therefore, $$SNR_c \gtrsim 10,$$

which is sufficient for accurate power and phase measurements. The standard deviation of the noise in each part, real and imaginary, of the complex quantity c is given by $$\sigma_c \approx |c|/SNR_c.$$

The first-mentioned condition for accuracy in the measurements of the power and phase, namely that $(\phi - \phi_p)^*$ not vary by a substantial fraction of a cycle during the 1-second integration time, is equivalent to the condition that the difference between the actual received carrier frequency, f, and the local reference frequency, $f_o$, does not differ from the predicted (numerical oscillator) frequency, $f_p$, by a substantial fraction of 1 Hertz. This condition is satisfied in the present system by applying feedback control to the frequency of the numerical oscillator, to keep this frequency close to the actual received carrier frequency. This control is exercised by means of a simple program executed by the field terminal computer 39. A description of this program follows.

The complex number c formed from the a and b correlator outputs at the end of the kth one-second integration interval is designated $c(t_k)$, where $t_k$ represents the time at the middle of that interval. To the numerical oscillator frequency for the (k+1)st interval is added a corrective bias of $$K \cdot \angle[c(t_k)d^*(t_{k-1})]/2\pi \text{ Hertz},$$

where K is a positive real constant less than 1, $\angle[\,]$ denotes the angle of the complex quantity enclosed by the brackets []; and $c^*(t_{k-1})$ is the complex conjugate of the complex number c from the next-preceding, (k-1)st interval.

The principle of operation of this program may be understood from the following example: If the frequency prediction is, say, too low by 0.1 Hertz, then the angle of c will advance by 0.1 cycle in 1 second, and the complex quantity $c(t_k)c^*(t_{k-1})$ will have an angle of $(+0.1) \times (2\pi)$ radians (plus some zero-mean noise). Addition of the bias, which is positive in this case, will reduce the magnitude of the negative error in the frequency prediction from (0.1 Hz) to $(1-K) \times (0.1 \text{ Hz})$.

The value of K must be greater than zero or no reduction of a frequency prediction error will result form the feedback. The value must be less than 1 or the feedback will result in unstable oscillation of the error, due to the delay in applying the correction. The exact value is not critical, and the optimum value may be determined by experiment. A nominal value of 0.5 is used in the present system.

An important other effect of this frequency feedback is that the numerical oscillator frequency will be "pulled" toward the actual received carrier frequency from an initial frequency which may be as much as several Hertz above or below. This "pull-in" phenomenon is well known in the art of phase or frequency-tracking feedback loops, as discussed for examples in the book entitled Phaselock Techniques, by Floyd M. Gardner, published by John Wiley & Sons, Inc., New York, 1966.

The significance of the "pull-in" phenomenon for the present system is that the a priori knowledge of the survey mark positioned does not need to have less than a few kilometers of uncertainty.

A potentially adverse side-effect of the "pull-in" phenomenon in the present system is that the numerical oscillator that is supposed to be tracking a particular satellite may instead be pulled to the frequency of a different satellite if the latter's frequency is near the former's, and if the latter's signal is strong in comparison with the former's. To limit the damage that might result from such occurrences, the field terminal computer program contains a provision that limits the magnitude of the accumulated bias that may be added to the a priori frequency prediction, to about 10 Hz. Since the difference between two satellites', frequencies changes, typically, by about 1 Hz per second, it follows that only about 10 seconds of measurement data, or less than about 1 percent of the total data obtained at a field site, may be invalidated by tracking of a wrong satellite.

Experience indicates that this percentage is insignificant.

Figure 7:
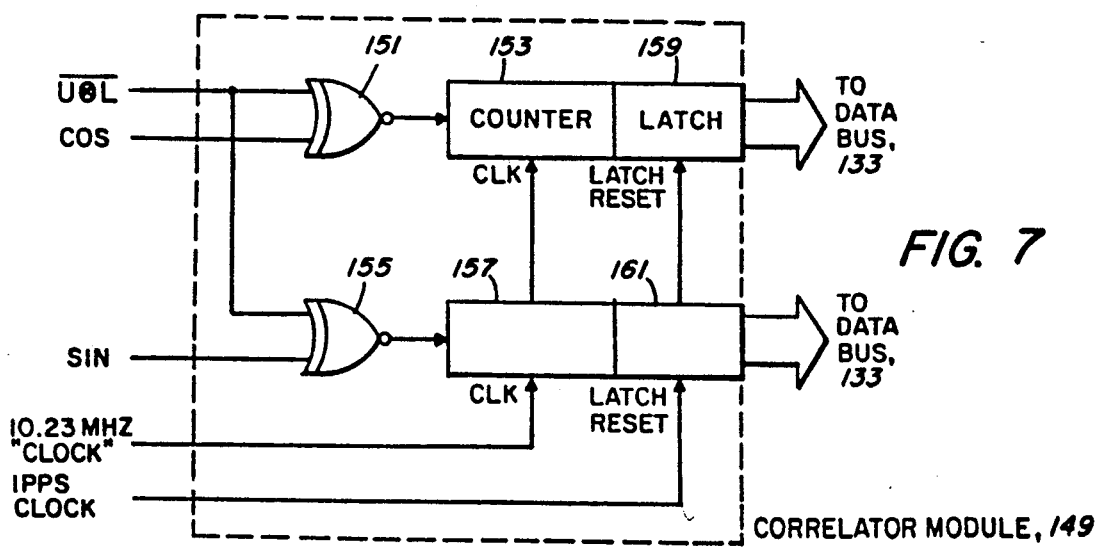
FIG. 7 is a block diagram of one of the correlator modules in the correlator assembly shown in FIG. 5.

Now referring to FIG. 7, we see a block diagram of a correlator module 149, one of the seven identical such modules in the correlator assembly 127. All seven modules have the same input U L, which is the U L output of the signal conditioner 125. Each module 149 also receives a "cosine" input and a "sine" input from a corresponding one of the seven numerical oscillator modules. The U L input and the cosine input go to an exclusive-nor gate 151 whose output is the input to a "clocked" digital counter 153. The U L input and the sine input go to another exclusive-nor gate 155 whose output is the input to another counter 157. Once per second, the contents of the counter registers 153, 157 are latched in respective output buffers 159, 161 by a pulse from the realtime clock 131 in the digital electronics assembly 37, and the counters are then reset to zero. At a rate of 10.23 MHz, governed by the "clock" signal from the signal conditioner 125, each counter 153, 157 increments by one if and only if its input, from its associated exclusive-non gate 151, 155, is "True". Thus, at the end of each one-second interval, the output buffer 159, 161 contents indicate the number of times, between zero and 10,230,000, that the U L and the cosine/sine inputs matched during the preceding 1 second. The output buffer 151, 155 contents of each outer are connected to the data bus 133, through which the field terminal computer 39 reads the contents each second. Each counter/latch may be a single integrated circuit such as the 32-bit device, model no. LS7060, made of LSI Systems, Inc.

The quantity a, defined previously by the crosscorrelation between $[u(t)l(t)]$ and $\cos[2\phi_p(t)]$, is obtained in the field terminal computer 39 by subtracting 5,115,000 from the output of the "cosine" counter and dividing the result by 5,115,000. The quantity b is obtained similarly by subtracting 5,115,000 from the "sine" counter output and dividing the result by 5,115,000. (Thus, unit magnitude of a or b represents perfect correlation between $[u(t)l(t)]$ and the cosine or the sine function, respectively. Before these results are stored in the memory of the field terminal computer 39, each number may be truncated to as few as 4 bits in order to conserve memory space.)

Figure 8:
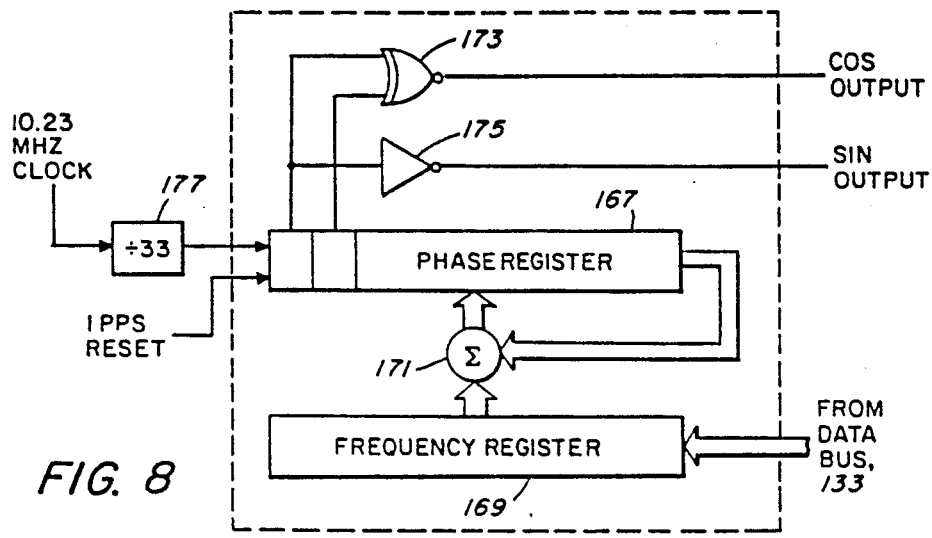
FIG. 8 is a block diagram of one of the numerical oscillator modules in the numerical oscillator assembly shown in FIG. 5.

Now referring to FIG. 8, there is illustrated a block diagram of one of the seven identical numerical oscillator modules 163 in the numerical oscillator assembly 129, each of which 163 furnishes a "cosine" and a "sine" input to one correlator module 149. Each numerical oscillator 163 comprises a binary phase register 167 and a binary frequency register 169; a binary adder 171; an exclusive-nor gate 173; an inverter 175; and a frequency divider 177.

The phase register 167 and the frequency register 169 each have 32 bits, and the adder 171 is a 32-bit adder. The binary number contained in phase register 167 at any time represents the phase of the oscillator output, with the most significant bit representing one-half cycle, the next-most significant bit representing one-quarter cycle, and so on. The binary number contained in frequency register 169 similarly represents the frequency of the oscillator, with the most significant bit in this case having a value of 155,000 Hz, equal to 1/66th cycle per period of the 10.23 MHz "clock" signal from the signal conditioner 125. Adder 171 adds together the numbers contained in the frequency 169 and phase 167 registers. The sum is loaded into the phase register 167, replacing the previous contents, once per cycle of the output from divider 177, which divides the 10.23 MHz "clock" signal by a fixed factor of 33. Phase register 167 is thus updated at a rate of exactly 310,000 times per second. The amount by which the phase advances upon each update is given by the contents of the frequency register 169. The frequency register 169, as mentioned, is updated 10 times per second via the data bus 133 by the field terminal computer 39. (Negative as well as positive frequencies are represented by the contents of the frequency register, using the conventional twoscomplement method. According to this convention, the negative of a binary number is formed by complementing each bit, then adding one. The largest positive number is accordingly represented by having the most significant bit zero, and all other bits ones. The most significant bit being one implies that the number is negative.)

The sine output of the numerical oscillator 163 is obtained from inverter 175 which inverts the most significant bit of the phase register 167. The sine output has a value of one when the phase is between zero and plus one-half cycle, and a value of zero when the phase is between on-half and one cycle (which is the same as the phase being between minus one-half and zero cycles). The cosine output of the numerical oscillator 163 is taken from the exclusive-nor gate 173 whose inputs are the most and the next-most significant bits of the phase register. The sine output has a values of one when and only when the phase is within plus or minus one-quarter cycle of zero.

Figure 9:
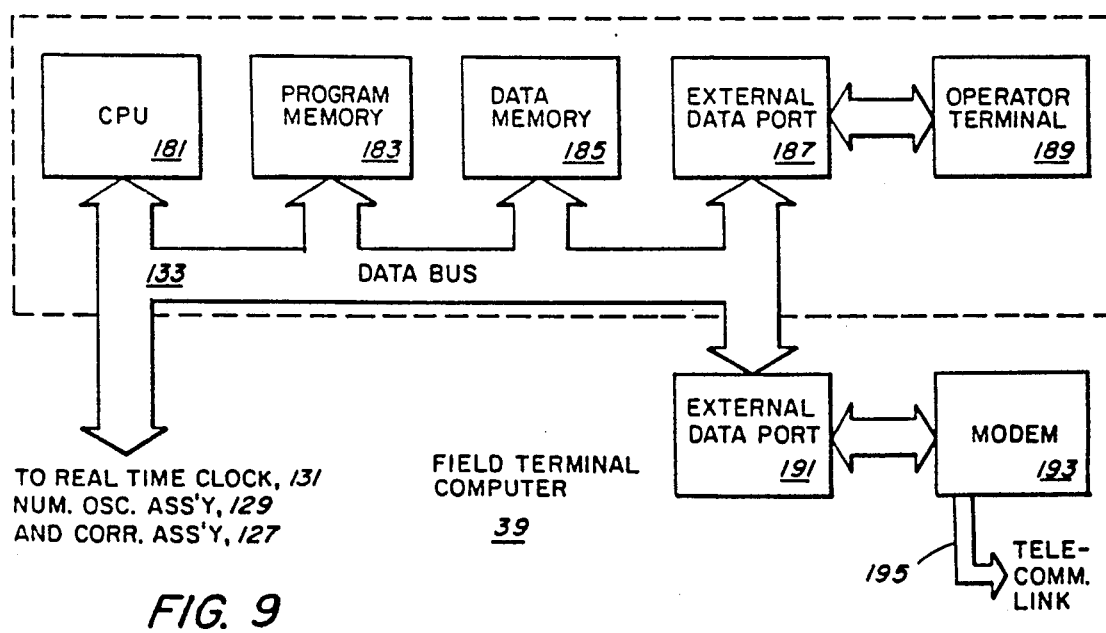
FIG. 9 is a block diagram of the field terminal computer shown in FIG. 2.

Now referring to FIG. 9, there is shown a block diagram of the field terminal computer 39. The computer comprises a central processing unit (CPU) 181, a program memory 183, a data memory 185, an external, bi-directional data port 187 which is connected to an operator terminal 189, and an external, bi-directional data port 191 which is connected to a modulator-demodulator (modem) 193 which is in turn connected to a telephone line, a radiotelephone, or some other telecommunications link 195. The parts of the computer 39 are interconnected by means of a data bus 197, which also serves to connect computer 39 to other parts of the field terminal (see FIG. 5).

CPU 181 may be a Digital Equipment Corporation (DEC) model LSI-11/2 (part number KD11-GC); program memory 183 may be a 32 K byte programmable read-only memory such as DEC part number MRV11-C; data memory 185 may be a 32 K byte, random-access, read-write memory such as DEC part number MXV11-AC; the two external bi-directional data ports (187 and 191) may be the RS-232 serial data ports which are included in the MXV11-AC; operator terminal 189 may be the DEC model VT-100 or any equivalent serial ASCII terminal which, like the VT-100, can be connected to the RS-232 serial data interface of the MXV11-AC, or through any other suitable external data port device to the computer; modem 193 may be any standard, RS-232 compatible, device, and may be eliminated completely if, as mentioned, the field terminal computer 39 is connected directly to the base terminal computer 15. The data bus 197 may be the LSI-11 Q-bus. The real-time clock 131, the numerical oscillator assembly 129, and the correlator assembly 127 may be connected to the Q-bus by constructing them on standard circuit cards that pug directly into the card-edge connectors of the "backplane" of an LSI-11 computer system Such circuit cards are available from DEC equipped with special integrated circuits that can handle all data communication between the Q-bus and the special interferometer terminal circuits which are constructed on the cards.

The measurement data stored in the memory 185 of the field terminal computer 39 comprises a time series of complex numbers for each of up to seven satellites observed, with one such number being obtained each second of time. These data are obtained for a time span of about 5,000 seconds, during which at least two satellites are always observed, with the average number of satellites observed being at least four. For the ith satellite at the time t, the complex datum is designated $A_i(t)$, where the magnitude of this complex number is proportional to the measured power of the signal received from that satellite at that time, the constant of proportionality being arbitrary but the same for all satellites, and where the angle of the complex number is equal to twice the carrier phase measured for the same satellite at the same time, with the phase for each satellite being referred to the same local reference oscillator signal, namely the 1575.42 MHz signal generated by the oscillator assembly 57 of the field terminal 13-1.

The complex data $A_i(t)$, $i=1, \ldots, 7$, are derived by the field terminal computer 39 from the a and b outputs of the seven correlators 149 in the correlator assembly 127 as follows. For the ith correlator, $$A_i(t) = [a(t) + jb(t)] \exp[2j\phi_p(t)],$$

where $a(t)$ and $b(t)$ represent, respectively, the normalized a and b outputs for the 1-second "integration," or counting, interval centered at the time t; j is the square root of minus one; and $2\phi_p(t)$ is twice the predicted carrier phase of the ith satellite at the time t. Note that the complex number $A_i(t)$ is equal to the complex number c derived from the ith correlator output, multiplied by $\exp[2j\phi_p(t)]$. The angle of $A_i$ represents (twice) the received carrier phase referred to (twice) the phase of the 1575.42 MHz local reference, whereas the angle of c is referred to (twice) the sum of that reference oscillator phase plus the numerical oscillator phase.

For the purpose of this explanation, it is considered that the data set $\{A_i(t)\}$ is the one generated by the field terminal 13-1 which is at the origin of the baseline vector. The other field terminal 13-2, that is the field terminal at the terminus of the baseline vector, observing the same satellites at the same times as the first terminal, yields data corresponding to $A_i(t)$, designated $B_i(t)$. The same satellites are observed because both terminals were given prediction data from the same central computer 15, which numbered the satellites 1 through 7 in just one way. The observations at the two terminals are effectively simultaneous because the two terminals' clocks were synchronized immediately prior to the observations, and the clock rates differ by a trivial amount. (The principal effect of the rate difference between the crystal oscillators that govern the rates of the clocks is to vary the phase difference between the 1575.42 MHz references.) It will not matter if, at a particular time, a particular satellite is visible from one terminal but hidden from the other. The magnitude of either $A_i(t)$ or $B_i(t)$ in this case will simply be zero, or nearly so.

The operations performed by the central computer 15 in order to complete the determination of the baseline vector of the interferometer, given the power and phase measurement data collected from two field terminals 13-1 and 13-2 located at the ends of the baseline vector, will now be discussed.

The first step in the processing of the $A_i(t)$ and the $B_i(t)$ data in the central computer is to multiply the complex conjugate of $A_i(t)$, denoted by $A_i^*(t)$, by $B_i(t)$. The product, $$S_i(t) = A_i^*(t) B_i(t),$$

has an angle, $\angle S_i(t)$, equal to twice the difference between the measured phases of the carrier signals received from the ith satellite at the two terminals, each phase having been measured with respect to the local reference oscillator in the respective terminal. Accordingly, the angle of $S_i(t)$ is related to the difference between the phases of the local oscillators and to the baseline vector between the terminals by the theoretical relation $$\phi S_i(t) \simeq \Delta\phi_{LO} + (4\pi f_i/c) b \cdot s_i(t),$$

wherein $\Delta\phi_{LO}$ represents the local-oscillator phase difference, $f_i$ is the received frequency for the ith satellite, nearly equal to 1575.42 MHz, c is the speed of light, b is the baseline vector, and $s_i(t)$ is a unit vector in the direction of the ith satellite as viewed at the time t from the midpoint of the baseline vector. (This relation yields the angle $\angle_i(t)$ in radians rather than cycles. Since the frequency $f_i$ is specified in cycles, rather than radians, per second, a factor of $2\pi$ must be included. The reason that $4\pi$, rather than $2\pi$, appears here is that each field terminal measures twice the received signal phase.) This relation is approximate inasmuch as it ignores second-order parallax, effects of the propagative medium, multipath, relativistic effects, noise, etc. These small effects are neglected here for the sake of clarity. The error associated with the neglect of these effects is equivalent to a baseline error of less than about 1 cm for a baseline length of less than about 1 km. [Except for the effect of noise, which is completely random, it is possible to model the effects which we have neglected above, in order to obtain a more accurate theoretical representation of $\angle S_i(t)$. This modeling is described, for example, in the article by I. I. Shapiro entitled "Estimation of astrometric and geodetic parameters from VLBI observations," appearing in Methods of Experimental Physics, vol. 12, part C, pp. 261-276, 1976.]

Theoretically the magnitude of S is given by $$|S_i| = C \cdot G^2(\cos\theta_i),$$

where C is a constant and G is the directive power gain of a receiving antenna, written as a function of the cosine of the ith satellite's zenith angle $\theta_i$. G is assumed to be independent of azimuth, and is normalized such that the power received by an isotropic antenna of matched circular polarization is equal to 1. For the MITES antenna design, $$G(\cos\theta) \simeq (1.23) \cdot (1 + \cos\theta)^2 \cdot \sin^2((3\pi/4)\cos\theta),$$

$$0° \leq \theta \leq 90°; \quad G(\cos\theta) \simeq 0, \quad 90° \leq \theta.$$

The value of this function is approximately 2.46 at the zenith ($\theta = 0$); it has one maximum, of about 3.63, at $\theta \simeq 40°$, has unit value at $\theta \simeq 72°$, and approaches 0 as $\theta$ approaches 90°.

The next step in the processing of the measurement data obtained from the two interferometer terminals is to sum the complex numbers $S_i(t)$ over i to obtain a sumn S(t) for each measurement time t:

$$S(t) = \sum_{i=1}^{n} S_i(t),$$

wherein the sum ranges over all the satellites that were observed at the time t.

The next step in the processing of the measurement data is to choose a trial value, b, of the baseline vector b, and from this value b to compute a function of time S(t) which represents theoretically the value that S(t) would have had if the true value, b, of the baseline vector were equal to the trial value, b:

$$S(t) = \sum_{i=1}^{n} |A_i(t)| \cdot |B_i(t)| \cdot \exp[-j4\pi b \cdot s_i(t)/\lambda_i]$$

wherein $\lambda_i$ is the radio wavelength corresponding to the received carrier frequency. That is, $\lambda_i = c/f_i$. The method of choosing a value of b is described below. Note that in the theoretical functions S(t), as opposed to the measurement-derived function S(t), no term is present to represent the local-oscillator phase difference. Also, the constant scale factor C is omitted.

Next, the magnitude of S(t) is multiplied by the magnitude of S(t) and the product of these magnitude is summed over all of the measurement times to obtain a value, R(b); that depends on b as well, of course, as on the measurements:

$$R(b) = \sum_{l} |S(t_l)| \cdot |S(t_l)|,$$

wherein $t_l$ represents the lth of the set of about 5,000 measurement times. R(b) is called an "ambiguity function."

The next step in the processing is to repeat the computation of R(b) for various values of b and to determine the particular value of b for which the function of R(b) has the greatest value. This value of b is the desired determination of the baseline vector b.

The trial value b of the baseline vector is chosen initially to equal the peat a priori estimate of b that is available from independent information on the positions of the survey marks, such as the positions obtained by identifying landmarks on a map. The maximization of R(b) with respect to b is conducted by searching a three-dimensional volume that is centered on this initial value of b and is large enough to encompass the uncertainty of the initial estimate. In the search, every point of a uniformly spaced three-dimensional grid is examined to locate the one point at which R(b) is maximum. The grid spacing is initially 1 meter. Then the volume extending 2 meters from that one point of maximum R(b) is searched by examining a grid with 20 centimeter spacing. The maximum of R(b) is found on this more finely spaced grid. Then the grid spacing is halved and the linear extent of the grid is also halved, and the search is repeated. This process of halving is continued until the grid spacing is under 1 millimeter. The value of b that finally maximizes R(b) is taken to be the desired determination of the baseline vector b. By using a number of satellites n equal to 5, a baseline vector determination can be obtained by the method of the present invention with an accuracy of about 5 millimeters in each coordinate for a baseline length of about 100 meters.

The above-described method of processing measurement data from a pair of interferometer terminals in order to determine the baseline vector between the terminals represents a specialization of the general method described in the above referenced U.S. patent application Ser. No. 305,142. The general method disclosed in that application is also described in an article by Charles C. Counselman and Sergei A. Gourevitch, entitled "Miniature Interferometer Terminals for Earth Surveying: Ambiguity and Multipath with Global Positioning System", published in IEEE Transactions on Geoscience and Remote Sensing, vol. GE-19, no. 4, pp. 244-252, October, 1981.

In another embodiment of a method of processing measurement data according to this invention, an ambiguity function R(b) is also formed from the measurement data and from a trial value, b, of the baseline; however, the method of forming the function is different. In this embodiment, as in the previous embodiment, the complex conjugate of $A_1(t)$ is multiplied by $B_i(t)$ to obtain a complex product $S_i(t)$;

$$S_i(t) = A^*_i(t) B_i(t)$$

wherein $A_i(t)$ is a complex number representative of the measurements of the signal received from the ith satellite at one interferometer terminal at the time t, the magnitude of $A_i(t)$ being proportional to the power received and the angle $\angle A_i(t)$ being twice the phase of the carrier relative to the local oscillator of the terminal, and $B_i(t)$ is like $A_i(t)$ except that it is derived from the other terminal, at the other end of the baseline vector.

Next, $S_i(t)$ is multiplied by a certain complex exponential function of a trial value, b, of the baseline vector, and the product is then summed over all satellites observed at the time t to obtain a sum S(t) which is a function of the time and of the trial value, b:

$$S(t) = \sum_{i=1}^{n} S_i(t) \exp[-j4\pi b \cdot s_i(t)/\lambda_i]$$

wherein $s_i(t)$ is a unit vector in the direction of the ith satellite at the time t and $\lambda_i$ is the wavelength of the signal received from the ith satellite. (Note that if b equals b, then the angle of the ith satellite. (Note that if b equals b, then the angle of each term in the sum over i is equal to $\Delta\phi_{LO}$, independent of i.)

Next, the magnitude of S(t) is taken and is summed over all observing times to obtain the function R(b):

$$R(b) = \sum_{l} |S(t_l)|,$$

wherein $t_l$ is the lth of the approximately 5,000 measurement times.

Finally, the value of b which maximizes R(b) is found, by the same search procedure that was described in connection with the original data-processing method. This value of b is the desired determination of the baseline vector b.

This latter embodiment is more efficient computationally than the first described embodiment.

I claim:

1. A method of determining position information from a composite of spread spectrum, suppressed carrier signals transmitted simultaneously at the same frequencies by a plurality of orbiting satellites and received simultaneously from different directions by an antenna, comprising:

(a) forming a digital representation of said composite;

(b) applying said digital representation to a plurality of logic circuits, each said logic circuit being responsive to the signal transmitted by a different selected satellite and operating synchronously in response to a common clock;

(c) deriving simultaneously, in each said logic circuit, data representing the signal transmitted by the satellite to which each said logic circuit is responsive; and (d) combining the simultaneously derived data from a plurality of said logic circuits to determined position information.

2. The method of claim 1 wherein the simultaneously derived data are related to the phases of carrier waves implicit in the signals received from the satellites.

3. The method of claim 2 wherein the digital representation of the composite is derived by sampling an analog representation of the composite.

4. The method of claim 3 wherein the analog representation is a spread spectrum signal received from a plurality of satellites.

5. The method of claim 4 wherein the analog representation is a baseband signal.

6. The method of claim 5 wherein the signal received from each said satellite is a double sideband signal and the baseband signal represents a selected sideband thereof.

7. Apparatus for determining position information from a composite of spread spectrum, suppressed carrier signals transmitted simultaneously at the same frequencies by a plurality of orbiting satellites and received simultaneously from different directions by an antenna, comprising:

(a) means for forming a digital representation of said composite;

(b) a plurality of logic circuits operating synchronously in response to a common clock, each said logic circuit being responsive to a signal transmitted by a different selected satellite included in said digital representation;

(c) means in each said logic circuit for deriving simultaneously data representing the signal transmitted by the satellite to which each said logic circuit is responsive; and (d) means for combining the simultaneously derived data from a plurality of said logic circuits to determine position information.

8. The apparatus of claim 7 wherein the means in each logic circuit for simultaneously deriving data includes means for simultaneously deriving data related to the phase of a carrier wave implicit in the signal received from the selected satellite.

9. The apparatus of claim 8 wherein the means for forming a digital representation of the composite includes means for sampling an analog representation of the composite.

10. The apparatus of claim 9 wherein the analog representation is a spread spectrum signal received from a plurality of satellites.

11. The apparatus of claim 10 wherein the analog representation is a baseband signal.

12. The apparatus of claim 11 wherein the signal received from each said satellite is a double sideband signal and the baseband signal represents a selected sideband thereof.

* * * * *

UNITED STATES PATENT AND TRADEMARK OFFICE
CERTIFICATE OF CORRECTION

PATENT NO. : B1 5,014,066  
DATED : Jan. 30, 1996  
INVENTOR(S) : Charles C. Counselman, III Page 1 of 18

It is certified that error appears in the above-indentified patent and that said Letters Patent is hereby corrected as shown below: On the title page, please add the following references to Item [56], AA    Thomas A. Stansell, Jr.; "The MX 1502 Satellite Surveyor"; Proc. of the Second Int. Geodetic Symp. on Satellite Doppler Positioning; Jan. 22-26, 1979, Sec. 4.2, pp. 512-514.

AB    Rudolph K. Larsen; "Measurements to Determine the Location of the Phase Center of Geoceiver Antennas"; Proc. of Second Int. Geodetic Symp. on Satellites, Jan. 22-26, 1979, pp. 577-585.

AC    W. O. Henry, "Some Developments in Loran", *Journal of Geophysical Research*, Vol. 65, No. 2, February 1960, pp. 506-513

AD    J. A. Pierce, "Omega", *IEEE Transactions on Aerospace and Electronic Systems*, Vol. AES-1, No. 3, December 1965, pp. 206-215

AE    Alan E. E. Rogers, "Broad-Band Passive 90° RC Hybrid With Low Component Sensitivity for Use in the Video Range of Frequencies", *Proceedings of the IEEE*, Vol. 59, 1971, pp. 1617-1618.

AF    M. L. Meeks, Editor, *Methods of Experimental Physics*, Vol 12 (Astrophysics), PART C (Radio Observations), 1976:

Chapter 5.5: J. M. Moran, "Very Long Baseline Interferometric Observations and Data Reduction", pp. 228-260.

Chapter 5.6: I. I. Shapiro, "Estimation of Astrometric and Geodetic Parameters", pp. 261-276.

AG    "OPERATING MANUAL STI MODEL 5010 GPS RECEIVER", *STANFORD TELECOMMUNICATIONS INC. STI-O&M-8707B*, February 25, 1980, selected pages as follows: title page, i-vi, 1-1, 1-3, 2-1 through 2-5, 3-1 through 3-3, 6-1 through 6-9.

AH    "PIONEER VENUS PROJECT, DIFFERENCED LONG-BASELINE INTERFEROMETRY EXPERIMENT, DESIGN REVIEW DOCUMENT", *NASA AMES RESEARCH CENTER, MOFFETT FIELD, CALIFORNIA*, July 1, 1977, 23 pages.

AI    A. E. E. Rogers, C. A. Knight, H. F. Hinteregger, A. R. Whitney, C. C. Counselman III, I. I. Shapiro, S. A. Gourevitch and T. A. Clark, "Geodesy by Radio Interferometry: Determination of a 1.24-km Base Line Vector with ~5 mm Repeatability", *Journal of Geophysical Research*, Vol. 83, No. B1, pp. 325-334, January 10, 1978.

UNITED STATES PATENT AND TRADEMARK OFFICE
CERTIFICATE OF CORRECTION

PATENT NO. : B1 5,014,066

DATED : Jan. 30, 1996

INVENTOR(S) : Charles C. Counselman, III

Page 2 of 18

It is certified that error appears in the above-indentified patent and that said Letters Patent is hereby corrected as shown below:

AJ   W. E. Carter, A. E. E. Rogers, C. C. Counselman III, and I. I. Shapiro, "Comparison of Geodetic and Radio Interferometric Measurements of the Haystack-Westford Base Line Vector", Journal of geophysical Research, Vol. 85, No. 5, pp. 2685-2687, May 10, 1980.

AK   R. A. Preston, R. Ergas, H. F. Hinteregger, C. A. Knight, D. S. Robertson, I. I. Shapiro, A. R. Whitney, A. E. E. Rogers, and T. A. Clark, "interferometric Observations of an Artificial Satellite", Science, vol. 178, pp. 407-409, October 27, 1972.

AL   R. J. Anderle, "Application of the NAVSTAR GPS Geodetic Receiver to Geodesy and Geophysics"., Naval Surface Weapons Center Tech. Rept. No. 80-282, 1980.

AM   J. J. Spilker, Jr., Digital Communications by Satellite, Prentice-Hall, Englewood Cliffs, N. J., pages i and ii (title pages), vii-xi (Table of Contents), and pp. 302-305 ("BPSK Carrier Recovery"), 1977.

AN   P. L. Bender, "A Proposal to the National Aeronautics and Space Administration For the Support of GPS SATELLITE ORBIT DETERMINATION USING THE RECONSTRUCTED CARRIER PHASE METHOD FOR TRACKING", Quantum Physics Division, National Bureau of Standards, Boulder, Colorado, pp. 1-12, submitted August 5, 1980.

AO   Peter l. Bender, National Bureau of Standards, private communication, 1978.

AP   C. C. Counselman III, R. J. Cappallo, S. A. Gourevitch, R. L. Greenspan, T. A. Herring, R. W. King, A. E. E. Rogers, I. I. Shapiro, R. E. Snyder, D. H. Steinbrecher, and A. R. Whitney, "ACCURACY OF RELATIVE POSITIONING BY INTERFEROMETRY WITH GPS: DOUBLE-BLIND TEST RESULTS", Proceedings of the Third International Geodetic Symposium on Satellite Doppler Positioning, pp. 1173-1176, February 8-12, 1982.

AQ   T. P. Yunck, "An Introduction to Series-X", Jet Propulsion Laboratory, California Institute of Technology, NASA Contract NAS 7-100, November 1982.

AR   Buennagel, MacDoran, Neilan, Spitzmesser and Young, "Satellite Emission Range Inferred Earth Survey (SERIES) Project: Final Report on Research and Development Phase, 1979 to 1983", JPL Publication 84-16, March 1, 1984.

UNITED STATES PATENT AND TRADEMARK OFFICE
CERTIFICATE OF CORRECTION

PATENT NO. : B1 5,014,066

DATED : Jan. 30, 1996

INVENTOR(S) : Charles C. Counselman, III

It is certified that error appears in the above-indentified patent and that said Letters Patent is hereby corrected as shown below:

AS  Crow, Betzacker, Najarian, Purcell, Statman and Thomas, "Series-X Final Engineering Report", JPL D-1476, August 1984.

AT  MacDoran, Whitcomb and Miller, "Codeless GPS Positioning Offers Sub-Meter Accuracy", Sea Technology, October 1984.

AU  MacDoran, Miller, Buennagel and Whitcomb, "Codeless Systems for Positioning With NAVSTAR-GPS", First International Symposium on Precise Positioning with the Global Positioning System, Positioning with GPS-1985, April 15-19, 1985.

AV  James Collins, "GPS Surveying Techniques", ACSM Bulletin, June 1985, pp. 17-20.

AW  "Proposal for a GPS Geodetic Receiver", The Johns Hopkins University Applied Physics Laboratory, April 1980.

AX  (This reference not used)

AY  Javad Ashjaee, "GPS Doppler Processing for Precise Positioning in Dynamic Applications", IEEE Oceans '85, November 1985.

AZ  I. I. Shapiro, "Thoughts on Mighty MITES", Memo from I. I. Shapiro to C. C. Counselman, S. A. Gourevitch, and R. W. King, Department of Earth and Planetary Sciences, M.I.T., 15 pages, December 29, 1980.

BA  Bossler et al., "Using the Global Positioning System for Geodetic Positioning", pp. 553-563, Bull. Geod. 54 (1980).

BB  W. N. Christiansen and J. A. Hogbom, Chap. 7, Entitled "Aperture Syntheses", pp. 171-189, of Book entitled "Radiotelescopes", published in 1969 by the Cambridge University Press, England.

BC  A. E. E. Rogers, "Very Long Baseline Interferometry with Large Effective Bandwidth for Phase Delay Measurements", Radio Science, vol. 5, No. 10, pp. 1239-1247, Oct., 1970.

BD  C.C. Counselman, III and I. I. Shapiro, "Miniature Interferometer Terminals for Earth Surveying," Proceedings of the Second International Symposium on Satellite Doppler Positioning, vol. 2, pp. 1237-1286, Jan. 22-26, 1979.

UNITED STATES PATENT AND TRADEMARK OFFICE
CERTIFICATE OF CORRECTION

PATENT NO. : B1 5,014,066
DATED : Jan. 30, 1996
INVENTOR(S) : Charles C. Counselman, III It is certified that error appears in the above-indentified patent and that said Letters Patent is hereby corrected as shown below:

- BE  C. C. Counselman, III, I. I. Shapiro, R. L. Greenspan & D. B. Box, Jr., "Backpack VLBI Terminal with Subcentimeter Capability", National Aeronautics & Space Admin. Conference publication 2115, Radio Interferometry Techniques for Geodesy, pp. 409-414, Published in 1979.

- BF  C. C. Counselman III et al., "Very Long Baseline Interferometric Geodesy with GPS Satellites', Proposed to NASA, July, 1980

- BG  G. Beutler, D. A. Davidson, R. B. Langley, R. Santerre, P. Vanicek and D. E. Wells, "Some Theoretical and Practical Aspects of Geodetic Positioning Using Carrier Phase Difference Observations of GPS Satellites", Published in Jul. 1984 as Technical Report No. 109 of Department of Surveying Engineering, of the University of New Brunswick, Canada.

- BH  R. I. Abbot, Y. Bock, C. C. Counselman, III, R. W. King, S. A. Gourevitch and B. J Rosen, Entitled "Interferometric Determination of GPS Satellite Orbits", Proceedings of the First International Symposium on Precise Positioning with the Global Positioning System, vol. 1, pp. 63-72, published May 1985 by the National Geodetic Information Center, National Oceanic and Atmospheric Administration, Rockville, Md., 20852, U.S.A.

- BI  G. Beutler, W. Gurtner, I. Bauersima and R. Langley, Entitled "Modelling and Estimating the Orbits of GPS Satellites", proceedings of the First International Symposium on Precise Positioning with the Global Positioning System, vol 1, pp. 99-111, Published May, 1985, by the National Geodetic Information Center, National Oceanic and Atmospheric Administration, Rockville, Md. 20852. U.S.A.

- BJ  Bock et al., " Establishment of Three-Dimensional Geodetic Control by Interferometry with the Global Positioning System", Journal of Geophysical Research, vol. 90, No. B9, pp. 7689-7703, Aug. 10, 1985.

- BK  R. W. King, E. G. Masters, C. Rizos, A. Stolz and J. Collins, Monograph, No. 9, Entitled "Surveying with GPS", Published by the School of Surveying, The University of New South Wales, Kensington, N.S.W. 2033, Australia, Nov. 1985.

- BL  E. Beutler, W. Gurtner, M. Rothacher, T. Schildknecht and I. Bauersima, "Evaluation of the 1984-Alaska-GPS-Campaign With the Bernese Second Generation Software", Paper presented at the AGU Fall Meeting, December 9, 1985, San Francisco.

UNITED STATES PATENT AND TRADEMARK OFFICE
CERTIFICATE OF CORRECTION

PATENT NO. : B1 5,014,066

DATED : Jan. 30, 1996

INVENTOR(S) : Charles C. Counselman, III

Page 5 of 18

It is certified that error appears in the above-indentified patent and that said Letters Patent is hereby corrected as shown below:

BM  G. Beutler, W. Gurtner, M. Rothacher, T. Schildknecht and I. Bauersima, "Using the Global Positioning System (GPS) for High Precision Geodetic Surveys: Highlights and Problem Areas", IEEE Plans '86 Position Location and Navigation Symposium Record", pp. 243-250, Published 1986 by Institute of Electrical & Electronics Engineers, New York.

BN  G. Beutler, W. Gurtner, M. Rothacher, T. Schildknecht and I. Bauersima, Entitled "Determination of GPS Orbits Using Double Difference Carrier Phase Observations from Regional Networks", Proceedings of the Fourth International Geodetic Symposium on Satellite Positioning, vol. 1, pp. 319-335, published in 1986 by the Applied Research Laboratories of the University of Texas at Austin.

BO  Y, Bock, S. A. Gourevitch, C. C. Counselman, III, R. W. King and R. I. Abbot, "Interferometric Analysis of GPS Phase Observations", manuscripta geodaetica, vol 11, pp. 282-288; Manuscript Rec'd by the Journal Apr. 2, 1986; published Dec., 1986

BP  Burkhard Schaffrin and Yehuda Bock, "A Unified Scheme for Processing GPS Dual-Band Phase Observations," 15-page Manuscript Submitted to Bulletin Geodesque, Dec. 3, 1986.

BQ  P. F. MacDoran, "SERIES-GPS APPLICATIONS TO AIR TRAFFIC SURVEILLANCE/COLLISION AVOIDANCE," Jet Propulsion Laboratory Interoffice Memo 335-81-004B, 5 pp., March 12, 1981.

BR  P. F. MacDoran, "GLOBAL TRAFFIC SURVEILLANCE/COLLISION AVOIDANCE SYSTEM USING SERIES AND GPS SIGNALS", National Aeronautics and Space Administration, New Technology Transmittal, NT Control Number NPO-15604, 10 pp., April 23, 1981.

BS  P. F. MacDoran, "NAVSTAR GLOBAL POSITIONING SYSTEM (GPS) ADAPTATION TO TRANSIT DOPPLER POSITIONING EQUIPMENT," Jet Propulsion Laboratory Interoffice Memo 335-81-022B, 5 pp., July 27, 1981.

BT  P. F. MacDoran, "NAVSTAR GLOBAL POSITIONING SYSTEM (GPS), ADAPTATION TO TRANSIT DOPPLER POSITIONING EQUIPMENT" National Aeronautics and Space Administration, New Technology Transmittal, NT Control Number NPO-15791, 8 pp., July 31, 1981.

UNITED STATES PATENT AND TRADEMARK OFFICE
CERTIFICATE OF CORRECTION

PATENT NO. : B1 5,014,066            Page 6 of 18
DATED : Jan. 30, 1996
INVENTOR(S) : Charles C. Counselman, III It is certified that error appears in the above-indentified patent and that said Letters Patent is hereby corrected as shown below:

BU    P. F. MacDoran, "SERIES APPLICATION TO EMERGENCY LOCATOR BEACONS," Jet Propulsion Laboratory Interoffice Memo 335-81-042B, 2 pp., October 26, 1981.

BV    B. Crow, "TOPOGRAPHY EXPERIMENT TOPEX," Jet propulsion Laboratory Notebook, cover dated Jan. 82, plus:

pp. 15-30, except p. 16; including p.25: copy of drawing entitled "SERIES CONCEPT SIMPLIFIED BLOCK DIAGRAM (TERRESTRIAL APPLICATIONS)." PFM/DJS (Peter F. MacDoran and Donovan J. Spitzmesser), Nov. 1981.

p.26: copy of drawing entitles "SERIES CONCEPT SIMPLIFIED INFORMATION FLOW," PFM/DJS (Peter F. MacDoran and Donovan J. Spitzmesser), Nov. 1981.

p.28: copy of drawing entitled "SERIES SIMPLIFIED BLOCK DIAGRAM," PFM/DJS (Peter F. MacDoran and J. Spitzmesser), 8/81.

BW    Joachim F. Muhs, E. Krause, Satellitennavigation zuverlassig und genau Walker Sat Nav 801. In: Yacht 1981, Nr.14, pp 118, 119, 121

BX    Satellitennavigation fur Yachten. In: Yacht 1980, Nr.23, p 38

BY    C. C. Counselman, III, Very-Long-Baseline Interferometry Techniques Applied to Problems of Geodesy, Geophysics, Planetary Science, Astronomy, and General Relativity, Proceedings of the IEEE, vol. 61, No. 9, September 1973, pp 1225-1230

BZ    ELECTRONICS AND COMMUNICATION IN JAPAN, vol. 55-B, no. 5, 1972, pages 102-108, New York, US: M. Fujita et al.: "Baseline Arrangement of Radio Interferometer Array for Tracking Artificial Satellites".

CA    IEEE EASCON 1985, 18th Annual Electronics and Aerospace Systems Conference, Washington, DC, 28th-30th October 1985, pages 9-18, IEEE, New York, RS; P.Y.C. Hwang et al.: "GPS Geodesy: Experimental Results Using the KALMAN Filter Approach".

CB    JOURNAL OF THE BRITISH INSTITUTION OF RADIO ENGINEERS, vol. 22, August 1961, pages 97-107, London, GB; B. G. Pressey: "Radio Tracking of Artificial Earth Satellites".

UNITED STATES PATENT AND TRADEMARK OFFICE
CERTIFICATE OF CORRECTION

PATENT NO. : B1 5,014,066
DATED : Jan. 30, 1996
INVENTOR(S) : Charles C. Counselman, III It is certified that error appears in the above-indentified patent and that said Letters Patent is hereby corrected as shown below:

| | OTHER DOCUMENTS (Including Author, Title, Date, Pertinent Pages, Etc.) |
|---|---|
| LC | "NAVSTAR Plan is Not so Bright in FAA's Eyes", North Atlantic Aviation, 1980 (specific volume and date citation unavailable). |
| LD | G.K. O'Neill, "Making the Skies Really Safe", Washington Post, Mar. 5, 1979, p.A-21. |
| LE | Elrod, B.D.; H.A. Bustamante; F. D. Natali, "A GPS Receiver Design for General Aviation Navigation", Position Location and Navigation Symposium, Atlantic City, New Jersey, Dec. 8-11, 1980, pp. 33-41. |
| JD | C. C. Counselman III, "Geodesy by Very Long Base Live Interferometry", Reviews of Geophysics and Space Physics, July 1975, Vol 13 No. 3. |
| KT | R. Mehra, "Estimation Theory", Encyclo. of Science and Tech., (5th Ed., 1982, pp. 192-5). |
| KU | "The Origins of Spread-Spectrum Communications," by Robert A. Scholz, Vol. COM-30, #5, May 1982, IEEE Trans. on Comm. |
| KV | Kai P. Yin, Ralph Eschenbach and Frank Lee, "Land Navigation With A Low Cost GPS Receiver", reprinted from the National Telecommunication Conference, No. 30-Dec. 4, 1980 by the IEEE. |
| KW | Hagerman, L.L. "Effects of Multipath on Coherent and Non-Coherent Ranging Receivers", The Aerospace Corporation Report No. TOR-0073 (3020-03)-3, 15 May 1973. |
| KX | R.E. Anderson, "A Navigation System Using Range Measurements from Satellites with Cooperating Ground Stations", Journal of the Institute of Navigation, Vol. 11, No.3, pp. 315-334 (fall 1964). |
| KY | J.W. O'Grady, "ATCRBS Trilateration: The Advanced Airport Surface Traffic Control Sensor", AGARD Conference Proceedings (No. 188) on Plans and Developments for Air Traffic Systems (Cambridge, Massachusetts, May 20-23, 1975). |
| KZ | G. David, "Digital Airborne Equipment for AEROSAT", Philips Telecommunication Review, Vol. 32, No.4, pp. 225-236. |
| LA | H. Hoffman, Jr., "Space Vehicle Communications and Tracking", Rome Air Development Center, Griffis Air Force Base, New York, pp. 227-239. |
| LB | Excerpts from NASA Report describing proposals for communications and/or navigation systems involving satellites (Citation unavailable). |

UNITED STATES PATENT AND TRADEMARK OFFICE
CERTIFICATE OF CORRECTION

PATENT NO. : B1 5,014,066  
DATED : Jan. 30, 1996  
INVENTOR(S) : Charles C. Counselman, III Page 8 of 18

It is certified that error appears in the above-indentified patent and that said Letters Patent is hereby corrected as shown below:

| | |
|---|---|
| IJ | John P. Costas, "Synchronous Communications", Proceedings of the IRE, December 1956, pp. 1713-1718. |
| HK | V. W. Spinney, "Application of the Global Positioning System as an Attitude Reference for Near-Earth Users", Bicentennial National Aerospace Symposium on New Frontiers in Aerospace Navigation, 1976, pp. 132-136. |
| HL | C. C. Counselman, III, "Miniature Interferometer Terminals for Earth Surveying (Mites): Geodetic Results and Multipath Effects", IEEE Int. Geoscience and Remote Sensors Symposium, Washington D.C., June 8-10, 1981, p. 219-224. |
| HM | Bruce R. Hermann, "Formulation for the NAVSTAR Geodetic Receiver System (NGRS), DTIC Report No. AD-A099829, March 1981. |
| HN | Penny D. Dunn et al., "Hydrographic Applications of the Global Positioning System", DTIC Report No. AD-A093750, December 1980. |
| HO | Newell, et al., "Application of the Global Positioning System to Nearshore Hydrographic Surveys", DTIC Report No. AD-A111511, September 1981. |
| HP | J. Dugundi, "Envelopes and Pre-Envelopes of Real Waveforms", IRE Transaction on Information Theory, March 1958, p. 53-57. |
| HQ | Cahn et al, "Software Implementation of PN Spread Spectrum Receiver to Accommodate Dynamics", IEEE Transactions on Communications, August 1977, Vol. Com-25, No. 8. |
| HR | Charles R. Cahn, "Improving Frequency Acquisition of a Costas Loop", IEEE Transactions on Communications, December 1977, Vol. Com-25, No. 12. |
| HS | Marvin K. Simon, "On the Optimality of the MAP Estimation Loop for Carrier Phase Tracking BPSK and QPSK Signals", IEEE Transactions on Communications, January 1979, Vol. Com-27, No. 1, p. 158-165. |
| HT | B. G. Glazer, GPS Receiver Operation, pp. 81-86. |

UNITED STATES PATENT AND TRADEMARK OFFICE
CERTIFICATE OF CORRECTION

PATENT NO. : B1 5,014,066

DATED : Jan. 30, 1996

INVENTOR(S) : Charles C. Counselman, III

Page 9 of 18

It is certified that error appears in the above-indentified patent and that said Letters Patent is hereby corrected as shown below:

| | |
|---|---|
| GW | Ellis, et al., "Interferometric Attitude Determination with the Global Positioning System", *Journal of Guidance and Control*, Vol. 2, No. 6, November - December 1979, pp. 522-527. |
| GX | David F. Mezera, "Geodetic Surveying: The Next Decade", *Journal of the Surveying and Mapping Division*, ASCE, Vol 105, No.1, November 1979, p. 93-108. |
| GY | Copps, et al., "Optimal Processing of GPS Signals", *Navigation*, Vol. 27, No. 3, Fall 1980, p. 171-182. |
| GZ | W. Michael Bowles, "Global-Positioning-System (GPS) Code Tracking and Acquisition Using Extended-Range Detectors", IEEE National Telecommunications Conference, Houston, Texas, November 30-December 4, 1980, Vol. 2, pp. 24.1.1 - 24.1.5. |
| HA | Holmes, et al., "GPS Receiver Simulation and Software Verification", International Telemetering Conference Proceedings, San Diego, California, October 14-16, 1980, pp. 497-506. |
| HB | Blair, et al., "Receiver for the NAVSTAR Global Positioning System", IEEE Proceedings, Part F: Communications, Radar and Signal Processing, Vol. 127, No. 2, April 1980, p. 163-167. |
| HC | Hermann, et al., "A Demonstration of Relative Positioning Using Conventional GPS Doppler Receiver", IEEE National Telecommunications Conference Record, New Orleans, La., Vol. 3, November 29-December 3, 1981, Vol. 3, p. F9.4.1 - F9.4.5. |
| HD | Phil Ward, "An Inside View of Pseudorange and Delta Pseudorange Measurements in a Digital NAVSTAR GPS Receiver", International Telemetering Conference, San Diego, California, October 13-15, 1981, Vol. 17, p. 1307-1315. |
| HE | Edward H. Martin, "Applications of GPS Phase Coherency", Abstract from the International Telemetering Conference, San Diego, California, October 13-15, 1981, Vol. 17, p. 1283. |
| HF | Ladd, et al., "The Macrometer II™ Dual-Band Interferometric Surveyor", p. 175-180. |
| HG | John H. Painter, "Design Studies for a Technology Assessment Receiver for the Global Positioning System", Final Report for NASA Grant 1639, Dept. of Electrical Engineering, Texas A & M University, College station, Texas, December 15, 1981. |
| HH | Patrick J. Fell, "Geodetic Positioning Using a Global Positioning System of Satellites", Report No. NASA-CR-163609, June 1980. |
| HI | Paul S. Jorgensen, "Combined Pseudo Range and Doppler Positioning for the Stationary NAVSTAR User", IEEE PLANS Position Location Navigation Symposium, Atlantic City, New Jersey, December 8-11, 1980, pp. 450-458. |
| HJ | Davis, et al., "Construction and Performance Characteristics of a Prototype NBS/GPS Receiver", Proceedings of the 35th Annual Frequency Control Symposium, Ft. Monmouth, N.J., May 27-29, 1981, pp. 546-552. |

UNITED STATES PATENT AND TRADEMARK OFFICE
CERTIFICATE OF CORRECTION

PATENT NO. : B1 5,014,066
DATED : Jan. 30, 1996
INVENTOR(S) : Charles C. Counselman, III It is certified that error appears in the above-indentified patent and that said Letters Patent is hereby corrected as shown below:

| | |
|---|---|
| GG | "GPS Navigator Receiver for Civil Aviation Quarterly Technical Letter", MIT Lincoln Laboratory Report No. GPS-QTL-4-6, April 1, 1981. |
| GH | Ronald R. Hatch, "Hyperbolic Positioning Per Se Is Passe", IEEE PLANS 1978 Position Location and Navigation Symposium, November 6-9, 1978, p. 51-58. |
| GI | Phil Ward, "An Advanced NAVSTAR GPS Multiplex Receiver", IEEE PLANS 80 Position Location and Navigation Symposium, December 8-11, 1980, p. 51-58. |
| GJ | Westerfield, et al., "Development of A Global Positioning System/Sonobuoy System for Determining Ballistic Missile Impact Points", Johns Hopkins APL Technical Digest, Vol. 5, No. 4, November 4, 1984, p. 335-340. |
| GK | Duven, et al., "Performance Experience of and Design Goals for the Satrack I and II Missile Tracking System", p. 833-841. |
| GL | Arthur R. Dennis, "Satellite Positioning and Navigation for Offshore Applications: Past, Present, and Future", Offshore Technology Conference, May 5-8, 1975, Paper No. OTC 2170, p. 243-254. |
| GM | Van Dierendonck, et al., "The Approach to Satellite Ephemeris Determination for the NAVSTAR Global Positioning System", Navigation, Vol. 23, No. 1, Spring 1976, p. 76-86. |
| GN | Carroll, et al., "Velocity Aiding of Noncoherent GPS Receiver", IEEE NAECON '77 paper, May 17-19, 1977, p. 311-318. |
| GO | Bjornsen, et al., "GDM/GPS Receiver Hardware Implementation", IEEE NAECON '77 paper, May 17-19, 1977, p. 303-309. |
| GP | Gopalapillai, et al., "Satellite Interferometer as an Advanced Navigation/Communication System", Navigation, Vol. 25, No. 4, Winter 1978-1979, p. 405-418. |
| GQ | Allen, et al., "NAVSTAR User Equipment for Civil and Military Applications", MIL Microwaves Conf. Proceedings, London, England, October 25-27, 1978, p. 405-409. |
| GR | Pergal, et al., "Factors Affecting Pseudonoise System Design in Microwave Satellite Communications", MIL Microwaves Conf. Proceedings, London, England, October 25-27, 1978, p. 61-74. |
| GS | N. B. Hemesath, "Performance Enhancements of GPS User Equipment", Navigation, Vol. 25, No. 2, Summer 1978, p. 195-200. |
| GT | A. J. Macmillan, "Application of Digital Techniques in the Global Positioning System (GPS) Program", Wescon Technical Papers, September 12-14, 1978, Vol. 22, Paper 21/3, 5pp. |
| GU | Hothem, et al., "Doppler Satellite Surveying System", Journal of the Surveying and Mapping Division, ASCE, Vol. 104, No. 1, November 1978, p. 79-91. |
| GV | David Terris, "Navigation Error Using Rate of Change of Signal Time of Arrival from Space Vehicles", Model Simul. Proc. Annual Pittsburgh Conf., April 25-27, 1979, Vol. 10, pp. 1847-1852. |

UNITED STATES PATENT AND TRADEMARK OFFICE
CERTIFICATE OF CORRECTION

PATENT NO. : B1 5,014,066
DATED : Jan. 30, 1996
INVENTOR(S) : Charles C. Counselman, III It is certified that error appears in the above-indentified patent and that said Letters Patent is hereby corrected as shown below:

|    | Publication No. | Date     | Country |
|----|-----------------|----------|---------|
| GE |                 |          |         |
| GF | 84/01832        | 05/10/84 | PCT     |
| JA | 1901840         | 10/02/69 | Germany |

| JT | 4,232,395 | 11/04/80 | Yokogawa |
|----|-----------|----------|----------|
| JU | 4,247,939 | 01/27/81 | Stromswold |
| JV | 4,384,357 | 05/17/83 | DeBuda |
| JW | 4,429,418 | 01/31/84 | Hooper |
| JX | 4,485,477 | 11/27/84 | Nossen |
| JY | 2,972,742 | 02/21/61 | Ross |
| JZ | 3,047,861 | 07/31/62 | Arnold |
| KA | 3,141,167 | 07/14/64 | Sandretto |
| KB | 3,153,237 | 10/13/64 | Lakatos |
| KC | 3,209,357 | 09/28/65 | Wyatt |
| KD |           |          |          |
| KE |           |          |          |
| KF |           |          |          |
| KG | 3,497,807 | 02/24/70 | Newton |
| KH | 3,534,367 | 10/13/70 | Lauglin |
| KI | 3,544,995 | 12/01/70 | Bottenberg |
| KJ | 3,560,975 | 02/02/71 | Manuali |
| KK | 3,665,464 | 05/23/72 | Meilander |
| KL | 3,668,403 | 06/06/72 | Meilander |
| KM | 3,742,498 | 06/26/73 | Dunn |
| KN | 3,789,409 | 01/29/74 | Easton |
| KO | 3,852,750 | 12/03/74 | Klein |
| KP | 3,852,763 | 12/03/74 | Kreutel, Jr. et al. |
| KQ | 4,161,730 | 07/17/79 | Anderson |
| KR | 4,485,383 | 11/27/84 | Maher |

UNITED STATES PATENT AND TRADEMARK OFFICE
CERTIFICATE OF CORRECTION

PATENT NO. : B1 5,014,066  Page 12 of 18
DATED : Jan. 30, 1996
INVENTOR(S) : Charles C. Counselman, III It is certified that error appears in the above-indentified patent and that said Letters Patent is hereby corrected as shown below:

| | | | |
|---|---|---|---|
| GA | 4,359,733 | 11/16/82 | O'Neill |
| GB | 4,423,419 | 12/27/83 | Johannessen |
| GD | | | |
| GC | 4,457,006 | 06/26/84 | Maine |
| IT | | | |
| IU | | | |
| IV | | | |
| IW | | | |
| IX | | | |
| IY | | | |
| JB | 3,497,697 | 02/24/70 | Brinkman |
| JC | 3,973,209 | 08/03/76 | Nossen |
| JE | 3,836,970 | 09/17/74 | Reitzig |
| JF | 4,468,793 | 08/28/84 | Johnson |
| JG | 3,941,984 | 03/02/76 | Chappell, et al. |
| JH | 4,024,383 | 05/17/77 | Beasley |
| JI | 4,042,923 | 08/16/77 | Merrick |
| JK | 4,232,313 | 11/04/80 | Fleishman |
| JL | 4,286,270 | 08/25/81 | Veslkov, et al. |
| JM | 4,119,926 | 10/10/78 | Frosch |
| JN | 4,221,005 | 09/02/80 | LaFlame |
| JO | 4,285,060 | 08/18/81 | Cobb |
| JP | 3,906,204 | 09/16/75 | Rigdon |
| JQ | | | |
| JR | 3,681,697 | 08/01/72 | Moroney |
| JS | 4,203,070 | 05/13/80 | Bowles |

OTHER DOCUMENTS (IncludingAuthor,Title,Date,PertinentPages,Etc.)

| | |
|---|---|
| MJ | Greenspan, R. L.; A. Ng; J. Przyjemski; J. Veale; C. C. Counselman III; S. A. Gourevitch, "Accurate Baseline Determination by Radio Interferometry on NAVSTAR GPS Satellite Transmissions; Report No. CSDL-R-1719; Final Report 1 April 1980 - 30 June 1982; 15 June 1984; from The Charles Stark Draper Laboratory, Inc., Department of Earth and Planetary Sciences, Massachusetts Institute of Technology, to Air Force Geophysics Laboratory, pp. 1-123. |
| | |

UNITED STATES PATENT AND TRADEMARK OFFICE
CERTIFICATE OF CORRECTION

PATENT NO. : B1 5,014,066

DATED : Jan. 30, 1996

INVENTOR(S) : Charles C. Counselman, III

Page 13 of 18

It is certified that error appears in the above-indentified patent and that said Letters Patent is hereby corrected as shown below:

| | U.S. PATENT DOCUMENTS | | |
|---|---|---|---|
| | Publication No. | Date | Inventor(s) |
| MA | 3,956,623 | MAY 11, 1976 | CLARK, ET AL |
| MB | 3,971,996 | JULY 27, 1976 | MOTLEY, ET AL |
| MC | 4,061,977 | DEC. 6, 1977 | MOTLEY, ET AL |
| MD | 4,178,631 | DEC. 11, 1979 | NELSON, JR. |
| ME | 4,246,654 | JAN. 20, 1981 | MAIM |
| MF | 4,405,986 | SEPT. 20, 1983 | GRAY |
| MG | 4,453,224 | JUNE 5, 1984 | CROOKS, JR. |
| MH | 3,680,124 | JULY 25, 1972 | STONE, ET AL |
| MI | 4,227,175 | OCT. 7, 1980 | NEWMAN |

# UNITED STATES PATENT AND TRADEMARK OFFICE
CERTIFICATE OF CORRECTION

PATENT NO. : B1 5,014,066

DATED : Jan. 30, 1996

INVENTOR(S) : Charles C. Counselman, III

It is certified that error appears in the above-indentified patent and that said Letters Patent is hereby corrected as shown below:

| | | |
|---|---|---|
| FM | UK Patent Application GB 2162013 A, | January 22, 1986 (publication date) |
| FN | UK Patent Application GB 2048604 A, | December 10, 1980 (publication date) |
| FO | British Patent Specification 1,595,146 | August 5, 1981 (publication date of the complete specification) |
| FP | PCT Int. Pub. Number WO 86/02458 | April 24, 1986 (international publication date) |
| FQ | PCT Int. Pub. Number WO 87/06713 | November 5, 1987 (international publication date) |
| FR | German Offenlegungsschrift 2 035 202 | Feb. 11, 1971 (offenlegungstag) |

Note: Document ED is the U. S. equivalent of this German language document FR.

| | | |
|---|---|---|
| FS | French Patent 1.260.471 | March 27, 1961 (issue date) |

UNITED STATES PATENT AND TRADEMARK OFFICE
CERTIFICATE OF CORRECTION

PATENT NO. : B1 5,014,066

DATED : Jan. 30, 1996

INVENTOR(S) : Charles C. Counselman, III

It is certified that error appears in the above-indentified patent and that said Letters Patent is hereby corrected as shown below:

| | | |
|---|---|---|
| FB | Norway 852191 | 5/31/85 |
| FC | German Offenlegungsschrift 1 944 804 | Mar. 19, 1970 (offenlegungstag) |
| FD | German Auslegeschrift 1 591 518 | April 23, 1970 (Auslegetag) |
| FE | German Auslegeschrift 1 285 577 | December 19, 1968 (Auslegetag) |
| FF | German Auslegeschrift 1 516 748 | July 6, 1972 (Auslegetag) |
| FG | German Patentschrift 2 127 087 | March 3, 1977 (Ausgabetag) |
| FH | EPO Publication No. 186198 A3, published July 2, 1986, Application No. 85116571.2, filing date December 24, 1985, priority Japan 281226/84, filed December 27, 1984. | |
| FI | EPO Publication No. 155776 A1, published September 25, 1985, Application No. 85301261.5, filing date February 25, 1985, priority Great Britain 8405386, filed March 1, 1984. | |
| FJ | French Patent Application 73.09010 | October 11, 1974 (date made available to the public) |
| FK | British Patent Specification 994,082 | June 2, 1965 (publication date of the complete specification) |
| FL | UK Patent Application GB 2126040 A, | March 14, 1984 (publication date) |

UNITED STATES PATENT AND TRADEMARK OFFICE
CERTIFICATE OF CORRECTION

PATENT NO. : B1 5,014,066

DATED : Jan. 30, 1996

INVENTOR(S) : Charles C. Counselman, III

Page 16 of 18

It is certified that error appears in the above-indentified patent and that said Letters Patent is hereby corrected as shown below:

```
DA    3,922,683      11/25/1975    Kumpebeck
DB    4,042,935      8/16/1977     Apioka et al.

DD    3,860,921      1/14/75       Wood
DE    3,900,873      8/19/75       Bouvier et al.
DF    3,906,204      9/16/75       Rigdon et al.
DG    4,045,796      8/30/77       Kline, Jr.
DH    4,054,879      10/18/77      Wright et al.
DI    4,232,389      11/04/80      Loiler
DJ    4,368,469      1/11/83       Ott et al.

DK    4,613,977      9/23/86       Wong et al.
DL    4,647,935      3/03/87       Helbing DM    4,387,376      6/07/1983     Sherril et al.

DN    4,443,,799     4/17/84       Rubin
DO    4.455,651      6/19/84       Baran
DP    4,484,335      11/20/84      Moseley et al.
DQ    4,578,678      3/25/86       Hurd
DR    4,613,864      9/23/86       Hofgen
DS    4,656,642      4/07/87       Apostolos et al.
DT    4,672,382      6/09/87       Fukuhara et al.

DU    3,702,477      11/07/72      Brown
DV    3,952,304      4/20/76       Broniwitz et al.
DW    5,036,329      7/30/91       Ando DX    3,430,234      2/25/69       Wright
DY    3,384,891      5/21/68       Anderson
DZ    3,126,545      3/24/64       Smith, Jr.
EA    3,191,176      6/22/65       Guier EB    4,426,712      1/17/84       Gorski-Popiel
EC    3,495,260      2/10/70       Laughlin et al.
ED    3,803,610      4/09/74       Hastings et al.
EE    4,652,884      3/24/87       Starker
```

UNITED STATES PATENT AND TRADEMARK OFFICE
CERTIFICATE OF CORRECTION

PATENT NO. : B1 5,014,066

DATED : Jan. 30, 1996

INVENTOR(S) : Charles C. Counselman, III

It is certified that error appears in the above-indentified patent and that said Letters Patent is hereby corrected as shown below:

CC   B. G. Glazer, GPS Receiver Operation, Navigation: Journal of The Institute of Navigation, Vol. 25, No. 2, Summer 1978, pp 173-178.

CD   Lawrence L. Wells, Real-Time Missile Tracking with GPS, paper presented at the ION Aerospace Meeting, April 1981, pp 105-111.

CE   Thomas Thompson, SATRACK - REVIEW AND UPDATE, Johns Hopkins APL Technical Digest, Volume 4, Number 2, 1983, pp 118-125.

CF   (This reference not used)

CG   Proposal for a GPS Geodetic Receiver, Prepared for Naval Surface Weapons Center Dahlgren, Virginia by Johns Hopkins University Applied Physics Laboratory Laurel, Maryland, March 31, 1980, 42 unnumbered pages.

CH   William M. Stonestreet, A Functional Description of the Navstar GPS Receiver Model X, Final Report for SAMSO Contract F04701-75-C-0212, Volume 1, April 26, 1976, revised February 1977, The Charles Stark Draper Laboratory, Inc., Cambridge, Massachusetts 02139, pp 1-74

CI   (This reference not used)

CJ   George Gorski-Popiel, ATC Project Memorandum No. 42PM-GPS-0001, Subject: Advanced Digital Receiver Design Study, Massachusetts Institute of Technology, Lincoln Laboratory, P.O. Box 73, Lexington, Massachusetts 02173, May 27, 1981, pp 1-47; Appendix A, pp A1-A10; Appendix B, pp. B1-B5; Appendix C, pp. C1-C2; and Appendix D, pp. D1-D8.

UNITED STATES PATENT AND TRADEMARK OFFICE
CERTIFICATE OF CORRECTION

PATENT NO. : B1 5,014,066

DATED : Jan. 30, 1996

INVENTOR(S) : Charles C. Counselman, III

It is certified that error appears in the above-indentified patent and that said Letters Patent is hereby corrected as shown below:

CK  Counselman, Gourevitch, King, Herring, Shapiro, Greenspan, Rogers, Whitney and Cappallo, "ACCURACY OF BASELINE DETERMINATIONS BY MITES ASSESSED BY COMPARISON WITH TAPE, THEODOLITE, AND GEODIMETER MEASUREMENTS", EOS, The Transactions of the American Geophysical Union, Vol. 62, No. 17, April 28, 1981, page 260.

CL  Counselman and Gourevitch, "MINIATURE INTERFEROMETER TERMINALS FOR EARTH SURVEYING: AMBIGUITY AND MULTIPATH WITH GLOBAL POSITIONING SYSTEM", IEEE Transactions on Geoscience and Remote Sensing, Vol. GE-19, No. 4, October 1981, pp. 244-252.

Signed and Sealed this

Twenty-seventh Day of August, 1996

Attest:

BRUCE LEHMAN

Attesting Officer      Commissioner of Patents and Trademarks

REEXAMINATION CERTIFICATE (2788th)
United States Patent [19]
Counselman, III

[11] B1 5,014,066
[45] Certificate Issued * Jan. 30, 1996

[54] SYSTEM FOR SIMULTANEOUSLY DERIVING POSITION INFORMATION FROM A PLURALITY OF SATELLITE TRANSMISSIONS

[75] Inventor: Charles C. Counselman, III, Belmont, Mass.

[73] Assignee: Western Atlas International, Inc., Houston, Tex.

Reexamination Request:
No. 90/003,781, Apr. 6, 1995

Reexamination Certificate for:
Patent No.: 5,014,066
Issued: May 7, 1991
Appl. No.: 382,291
Filed: Jul. 20, 1989

[*] Notice: The portion of the term of this patent subsequent to Feb. 28, 2006, has been disclaimed.

Related U.S. Application Data

[63] Continuation of Ser. No. 895,148, Aug. 11, 1986, Pat. No. 4,870,422, which is a continuation of Ser. No. 353,331, Mar. 1, 1982, Pat. No. 4,667,203.

[51] Int. Cl.⁶ .................. G01S 5/04; H04B 7/185
[52] U.S. Cl. .............. 342/352; 342/357; 342/465; 342/417; 342/444
[58] Field of Search .................. 342/352, 357, 342/450, 451, 453, 463, 464, 465, 417, 442, 444

[56] References Cited

U.S. PATENT DOCUMENTS

| | | | |
|---|---|---|---|
| 2,972,742 | 2/1961 | Ross | 342/451 |
| 3,047,861 | 7/1962 | Arnold | 342/456 |
| 3,141,167 | 7/1964 | Sandretto | 342/464 |
| 3,153,237 | 10/1964 | Lakatos | 342/393 |
| 3,209,357 | 9/1965 | Wyatt | 342/357 |
| 3,497,697 | 2/1970 | Brinkman | 250/203.3 |
| 3,497,807 | 2/1970 | Newton | 455/13.1 |
| 3,534,367 | 10/1970 | Lauglin | 342/456 |
| 3,544,995 | 12/1970 | Bottenberg | 342/46 |
| 3,560,975 | 2/1971 | Manuali | 342/356 |
| 3,665,464 | 5/1972 | Meilander | 342/36 |
| 3,668,403 | 6/1972 | Meilander | 342/36 X |
| 3,681,697 | 8/1972 | Moroney | 455/313 |

(List continued on next page.)

FOREIGN PATENT DOCUMENTS

| | | |
|---|---|---|
| 1901840 | 10/1969 | Germany . |
| 84/01832 | 5/1984 | WIPO ................ 5/2 |

OTHER PUBLICATIONS

"GPS Navigator Receiver for Civil Aviation Quarterly Technical Letter", MIT Lincoln Laboratory Report No. GPS-QTL-4-6, Apr. 1, 1981.
Ronald R. Hatch, "Hyperbolic Positioning Per Se Is Passe", IEEE PLANS 1978 Position Location and Navigation Symposium, Nov. 6-9, 1978, pp. 51-58.

(List continued on next page.)

*Primary Examiner*—John B. Sotomayor

[57] ABSTRACT

A method and a system are disclosed for measuring the baseline vector b between a pair of survey marks on the ground by radio interferometry using radio signals broadcast from the earth orbiting satellites of the NAVSTAR Global Positioning System (GPS), the radio signals broadcast by the satellites being double-sideband modulated with their carriers suppressed. The signals received by one antenna during a predetermined time span are separated into upper and lower sideband components. These separate components are filtered, converted to digital form, and then multiplied together. Differences in Doppler shift are utilized to distinguish the carriers of different satellites. Thus, the powers and carrier phases of the signals from a plurality of satellites are measured simultaneously and numerical data representing the measurement results are obtained at each survey mark. The measurements are performed in real time at each mark without reference to signals that are received at any other place and without knowledge of any of the coded signals that modulate the GPS carriers.

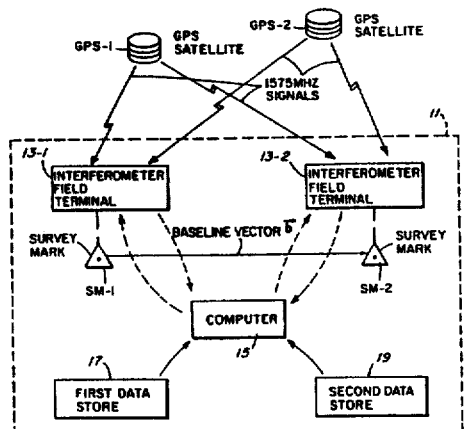

U.S. PATENT DOCUMENTS

| | | | |
|---|---|---|---|
| 3,742,498 | 6/1973 | Dunn | 342/88 |
| 3,789,409 | 1/1974 | Easton | 342/357 |
| 3,836,970 | 9/1974 | Reitzig | 342/352 |
| 3,852,750 | 12/1974 | Klein | 342/396 |
| 3,852,763 | 12/1974 | Kreutel, Jr. et al. | 343/761 |
| 3,906,204 | 9/1975 | Rigdon | 364/456 |
| 3,941,984 | 3/1976 | Chappell et al. | 364/452 |
| 3,973,209 | 8/1976 | Nossen | 327/105 |
| 4,024,383 | 5/1977 | Beasley | 364/449 |
| 4,042,923 | 8/1977 | Merrick | 342/42 |
| 4,119,926 | 10/1978 | Frosch | 331/1 A |
| 4,161,730 | 7/1979 | Anderson | 342/52 |
| 4,203,070 | 5/1980 | Bowles | 375/317 |
| 4,221,005 | 9/1980 | LaFlame | 375/367 |
| 4,232,313 | 11/1980 | Fleishman | 342/36 |
| 4,232,395 | 11/1980 | Yokogawa | 455/173.1 |
| 4,247,939 | 1/1981 | Stromswold | 375/350 |
| 4,285,060 | 8/1981 | Cobb | 375/376 |
| 4,286,270 | 8/1981 | Veslkov et al. | 342/418 |
| 4,359,733 | 11/1982 | O'Neill | 342/36 |
| 4,384,357 | 5/1983 | DeBuda | 375/327 |
| 4,423,419 | 12/1983 | Johannessen | 342/387 |
| 4,429,418 | 1/1984 | Hooper | 455/314 |
| 4,457,006 | 6/1984 | Maine | 375/87 |
| 4,468,793 | 8/1984 | Johnson | 375/344 |
| 4,485,383 | 11/1984 | Maher | 342/352 |
| 4,485,477 | 11/1984 | Nossen | 375/200 |

OTHER PUBLICATIONS

Phil Ward, "An Advanced NAVSTAR GPS Multiplex Receiver", IEEE PLANS 80 Position Location and Navigation Symposium, Dec. 8–11, 1980, pp. 51–58.

Westerfield, et al, "Development of A Global Positioning System/Sonobuoy System for Determining Ballistic Missile Impact Points", *Johns Hopkins APL Technical Digest*, vol. 5, No. 4, Nov. 4, 1984, pp. 335–340.

Duven, et al., "Performance Experience of and Design Goals for the Satrack I and II Missile Tracking System", pp. 833–841.

Arthur R. Dennis, "Satellite Positioning and Navigation for Offshore Applications: Past, Present, and Future", Offshore Technology Conference, May 5–8, 1975, Paper No. OTC 2170, pp. 243–254.

Van Dierendonck, et al., "The Approach to Satellite Ephemeris Determination for the NAVSTAR Global Positioning System", *Navigation*, vol. 23, No. 1, Spring 1976, pp. 76–86.

Carroll, et al., "Velocity Aiding of Noncoherent GPS Receiver", IEEE NAECON '77 paper, May 17–19, 1977, pp. 311–318.

Bjornsen, et al., "GDM/GPS Receiver Hardware Implementation", IEEE NAECON '77 paper, May 17–19, 1977, pp. 303–309.

Gopalapillai, et al., "Satellite Interferometer as an Advanced Navigation/Communication System", *Navigation*, vol. 25, No. 4, Winter 1978–1979, pp. 405–418.

Allen, et al., "NAVSTAR User Equipment for Civil and Military Applications", MIL Microwaves Conf. Proceedings, London, England, Oct. 25–27, 1978, pp. 405–409.

Pergal, et al., "Factors Affecting Pseudonoise System Design in Microwave Satellite Communications", MIL Microwaves Conf. Proceedings, London, England, Oct. 25–27, 1978, pp. 61–74.

N. B. Hemesath, "Performance Enhancements of GPS User Equipment", *Navigation*, vol. 25, No. 2, Summer 1978, pp. 195–200.

A. J. Macmillan, "Application of Digital Techniques in the Global Positioning System (GPS) Program", Wescon Technical Papers, Sep. 12–14, 1978, vol. 22, Paper 21/3, 5 pp.

Hothem et al., "Doppler Satellite Surveying System", *Journal of the Surveying and Mapping Division*, ASCE, vol. 104, No. 1, Nov. 1978, pp. 79–91.

David Terris, "Navigation Error Using Rate of Change of Signal Time of Arrival from Space Vehicles", Model Simul. Proc. Annual Pittsburgh Conf., Apr. 25–27, 1979, vol. 10, pp. 1847–1852.

Ellis, et al., "Interferometric Attitude Determination with the Global Positioning System", *Journal of Guidance and Control*, vol. 2, No. 6, Nov.–Dec. 1979, pp. 522–527.

David F. Mezera, "Geodetic Surveying: The Next Decade", *Journal of the Surveying and Mapping Division*, ASCE, vol. 105, No. 1, Nov. 1979, pp. 93–108.

Copps, et al., "Optimal Processing of GPS Signals", *Navigation*, vol. 27, No. 3, Fall 1980, pp. 171–182.

W. Michael Bowles, "Global–Positioning–System (GPS) Code Tracking and Acquisition Using Extended–Range Detectors", IEEE National Telecommunications Conference, Houston, Tex., Nov. 30–Dec. 4, 1980, vol. 2, pp. 24.1.1–24.1.5.

Holmes, et al., "GPS Receiver Simulation and Software Verification", International Telemetering Conference Proceedings, San Diego, Calif., Oct. 14–16, 1980, pp. 497–506.

Blair, et al., "Receiver for the NAVSTAR Global Positioning System", IEEE Proceedings, Part F: Communications, Radar and Signal Processing, vol. 127, No. 2, Apr. 1980, pp. 163–167.

Hermann, et al., "A Demonstration of Relative Positioning Using Conventional GPS Doppler Receiver", IEEE National Telecommunications Conference Record, New Orleans, La., vol. 3, Nov. 29–Dec. 3, 1981, vol. 3, pp. F9.4.1–F9.4.5.

Phil Ward, "An Inside View of Pseudorange and Delta Pseudorange Measurements in a Digital NAVSTAR GPS Receiver", International Telemetering Conference, San Diego, Calif., Oct. 13–15, 1981, vol. 17, pp. 1307–1315.

Edward H. Martin, "Applications of GPS Phase Coherency", Abstract from the International Telemetering Conference, San Diego, Calif., Oct. 13–15, 1981, vol. 17, p. 1283.

Ladd, et al., "The Macrometer II™ Dual–Band Interferometric Surveyor", pp. 175–180.

John H. Painter, "Design Studies for a Technology Assessment Receiver for the Global Positioning System", Final Report for NASA Grant 1639, Dept. of Electrical Engineering, Texas A & M University, College Station, Tex., Dec. 15, 1981.

Patrick J. Fell, "Geodetic Positioning Using a Global Positioning System of Satellites", Report No. NASA–CR–163609, Jun. 1980.

Paul S. Jorgensen, "Combined Pseudo Range and Doppler Positioning for the Stationary NAVSTAR User", IEEE PLANS Position Location Navigation Symposium, Atlantic City, N.J., Dec. 8–11, 1980, pp. 450–458.

Davis, et al., "Construction and Performance Characteristics of a Prototype NBS/GPS Receiver", Proceedings of the 35th Annual Frequency Control Symposium, Ft. Monmouth, N.J., May 27–29, 1981, pp. 546–552.

V. W. Spinney, "Application of the Global Positioning System as an Attitude Reference for Near–Earth Users", Bicentennial National Aerospace Symposium on New Frontiers in Aerospace Navigation, 1976, pp. 132–136.

C. C. Counselman, III, "Miniature Interferometer Terminals for Earth Surveying (Mites): Geodetic Results and Multipath Effects", IEEE Int. Geoscience and Remote Sensors Symposium, Washington, D.C., Jun. 8–10, 1981, pp. 219–224.

Bruce R. Hermann, "Formulation for the NAVSTAR Geodetic Receiver System" (NGRS), DTIC Report No. AD–AO99829, Mar. 1981.

Penny D. Dunn et al., "Hydrographic Applications of the Global Positioning System", DTIC Report No. AD–AO93750, Dec. 1980.

Newell, et al., "Application of the Global Positioning System to Nearshore Hydrographic Surveys", DTIC Report No. AD–A111511, Sep. 1981.

J. Dugundi, "Envelopes and Pre–Envelopes of Real Waveforms", *IRE Transaction on Information Theory*, Mar. 1958, pp. 53–57.

Cahn et al., "Software Implementation of PN Spread Spectrum Receiver to Accommodate Dynamics", *IEEE Transactions on Communications*, Aug. 1977, vol. Com–25, No. 8.

Charles R. Cahn, "Improving Frequency Acquisition of a Costas Loop", *IEEE Transactions on Communications*, Dec. 1977, vol. Com–25, No. 12.

Marvin K. Simon, "On the Optimality of the MAP Estimation Loop for Carrier Phase Tracking BPSK and QPSK Signals", *IEEE Transactions on Communications*, Jan. 1979, vol. Com–27, No. 1, pp. 158–165.

B. G. Glazer, *GPS Receiver Operation*, pp. 81–86.

John P. Costas, "Synchronous Communications", Proceedings of the IRE, Dec. 1956, pp. 1713–1718.

C. C. Counselman III, "Geodesy by Very Long Base Live Interferometry", *Reviews of Geophysics and Space Physics*, Jul. 1975, vol. 13 No. 3.

R. Mehra, "Estimation Theory", *Encyclo. of Science and Tech.*, (5th Ed., 1982, pp. 192–195).

"The Origins of Spread–Spectrum Communications," by Robert A. Scholz, vol. COM–30, #5, May 1982, IEE Trans. on Comm.

Kai P. Yin, Ralph Eschenbach and Frank Lee, "Land Navigation With A Low Cost GPS Receiver", reprinted from the National Telecommunication Conference, No. 30–Dec. 4, 1980 by the IEEE.

Hagerman, L. L. "Effects of Multipath on Coherent and Non–Coherent Ranging Receivers", *The Aerospace Corporation Report* No. TOR–0073 (3020–03)–3, 15 May 1973.

R. E. Anderson, "A Navigation System Using Range Measurements from Satellites with Cooperating Ground Stations", *Journal of the Institute of Navigation*, vol. 11, No. 3, pp. 315–334 (fall 1964).

J. W. O'Grady, "ATCRBS Trilateration: The Advanced Airport Surface Traffic Control Sensor", *AGARD Conference Proceedings* (No. 188) on Plans and Developments for Air Traffic Systems (Cambridge, Mass., May 20–23, 1975).

G. David, "Digital Airborne Equipment for AEROSAT", *Philips Telecommunication Review*, vol. 32, No. 4, pp. 225–236.

H. Hoffman, Jr., "Space Vehicle Communications and Tracking", Rome Air Development Center, Griffis Air Force Base, N.Y., pp. 227–239.

Excerpts from NASA Report describing proposals for communications and/or navigation systems involving satellites (Citation unavailable).

"NAVSTAR Plan is Not so Bright in FAA's Eyes", *North Atlantic Aviation*, 1980 (specific volume and date citation unavailable).

G. K. O'Neill, "Making the Skies Really Safe", *Washington Post*, Mar. 5, 1979, p. A–21.

Elrod, B. D.; H. A. Bustamante; F. D. Natali, "A GPS Receiver Design for General Aviation Navigation", Position Location and Navigation Symposium, Atlantic City, N.J., Dec. 8–11, 1980, pp. 33–41.

REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

The patentability of claims 1–12 is confirmed.

* * * * *